(12) United States Patent
Takahashi

(10) Patent No.: US 10,810,950 B2
(45) Date of Patent: Oct. 20, 2020

(54) LIGHT SOURCE CONTROL DEVICE, DISPLAY DEVICE, AND IMAGE PROCESSING DEVICE

(71) Applicant: Sharp Kabushiki Kaisha, Sakai, Osaka (JP)

(72) Inventor: Masayuki Takahashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/467,118

(22) PCT Filed: Oct. 11, 2017

(86) PCT No.: PCT/JP2017/036761
§ 371 (c)(1),
(2) Date: Jun. 6, 2019

(87) PCT Pub. No.: WO2018/110056
PCT Pub. Date: Jun. 21, 2018

(65) Prior Publication Data
US 2020/0074941 A1    Mar. 5, 2020

(30) Foreign Application Priority Data
Dec. 14, 2016   (JP) ................. 2016-242548

(51) Int. Cl.
*G09G 3/34*    (2006.01)
*G09G 3/36*    (2006.01)

(52) U.S. Cl.
CPC .............. *G09G 3/342* (2013.01); *G09G 3/36* (2013.01); *G09G 2320/066* (2013.01);
(Continued)

(58) Field of Classification Search
CPC .. G09G 3/342; G09G 3/36; G09G 2320/0626; G09G 2320/066; G09G 2330/023; G09G 2354/00
See application file for complete search history.

(56) References Cited

U.S. PATENT DOCUMENTS

2006/0139952 A1\* 6/2006 Inoue ................ G02F 1/133603
362/613
2008/0272999 A1\* 11/2008 Kurokawa ........... G09G 3/3611
345/89
(Continued)

FOREIGN PATENT DOCUMENTS

JP    2013-254358 A    12/2013
JP    2016-184058 A    10/2016
(Continued)

OTHER PUBLICATIONS

Official Communication issued in International Patent Application No. PCT/JP2017/036761, dated Jan. 16, 2018.

*Primary Examiner* — Dmitriy Bolotin
(74) *Attorney, Agent, or Firm* — Keating & Bennett, LLP

(57) ABSTRACT

A control unit is configured to enhance the contrast of an image through a simple process. The control unit is capable of connecting in a communicable manner to a point-of-gaze detection sensor and includes: a light-emission-intensity determination unit configured to determine a light emission intensity for each LED unit in such a manner that the light emission intensities of those LED units which are associated with a range of gaze including a point of gaze on a display screen are increased in excess of respective light emission intensities specified based on an image obtained from an HDR signal; and a light emission control unit configured to control light emission of the LED units.

6 Claims, 14 Drawing Sheets

(52) U.S. Cl.
CPC ............... *G09G 2320/0626* (2013.01); *G09G 2330/023* (2013.01); *G09G 2354/00* (2013.01)

(56) References Cited

U.S. PATENT DOCUMENTS

| | | | | |
|---|---|---|---|---|
| 2010/0073276 A1* | 3/2010 | Koike | .................. | G09G 3/3426 |
| | | | | 345/102 |
| 2010/0220048 A1* | 9/2010 | Yamamura | ........... | G09G 3/3426 |
| | | | | 345/102 |
| 2013/0120660 A1* | 5/2013 | Akita | ................... | G09G 3/3406 |
| | | | | 348/687 |
| 2013/0155125 A1* | 6/2013 | Inamura | ................... | G09G 5/10 |
| | | | | 345/690 |
| 2014/0002335 A1* | 1/2014 | Oda | ..................... | G09G 3/3406 |
| | | | | 345/102 |
| 2014/0043350 A1* | 2/2014 | Ikeda | ....................... | G01J 1/02 |
| | | | | 345/589 |
| 2014/0055505 A1* | 2/2014 | Ikeda | ....................... | G09G 3/22 |
| | | | | 345/690 |
| 2015/0009418 A1* | 1/2015 | Fujine | .................. | G09G 3/3426 |
| | | | | 348/791 |
| 2015/0116203 A1 | 4/2015 | Narita et al. | | |
| 2016/0027168 A1* | 1/2016 | Ikeda | ................... | H04N 1/4078 |
| | | | | 348/77 |
| 2016/0155372 A1* | 6/2016 | Ikeda | ................... | G09G 3/2092 |
| | | | | 345/589 |
| 2016/0286626 A1 | 9/2016 | Kano | | |
| 2017/0047022 A1 | 2/2017 | Ikeda | | |
| 2019/0138092 A1* | 5/2019 | Song | ....................... | G06F 3/013 |
| 2019/0371253 A1* | 12/2019 | Morein | ................ | G09G 3/3426 |

FOREIGN PATENT DOCUMENTS

| | | |
|---|---|---|
| WO | 2013/187289 A1 | 12/2013 |
| WO | 2015/166968 A1 | 11/2015 |

* cited by examiner

FIG.13
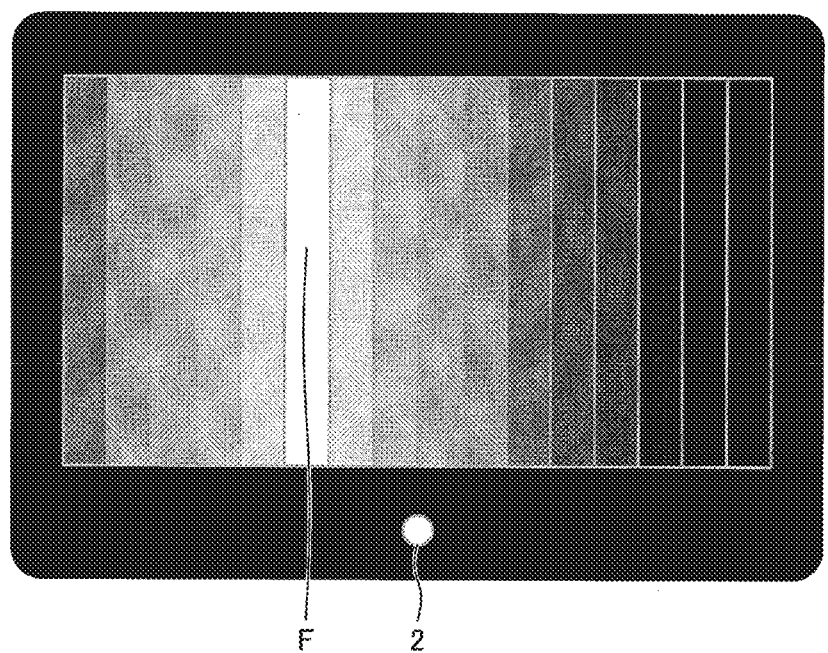
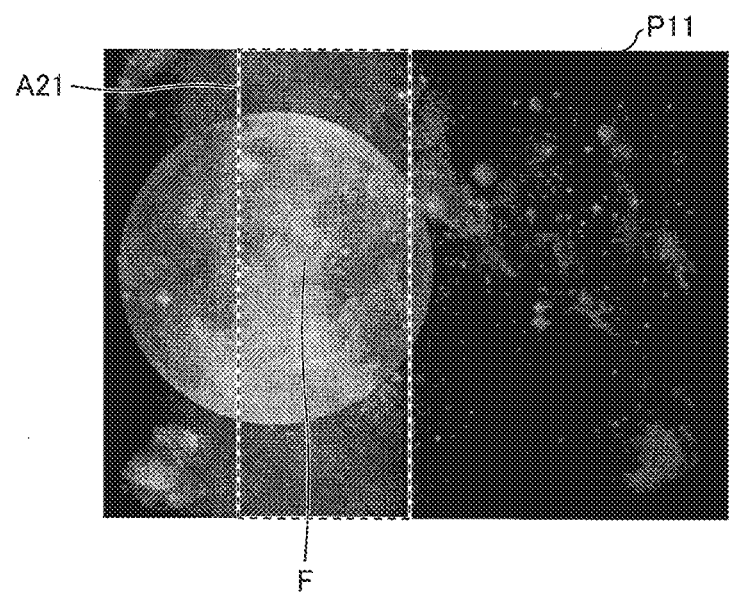

FIG.16
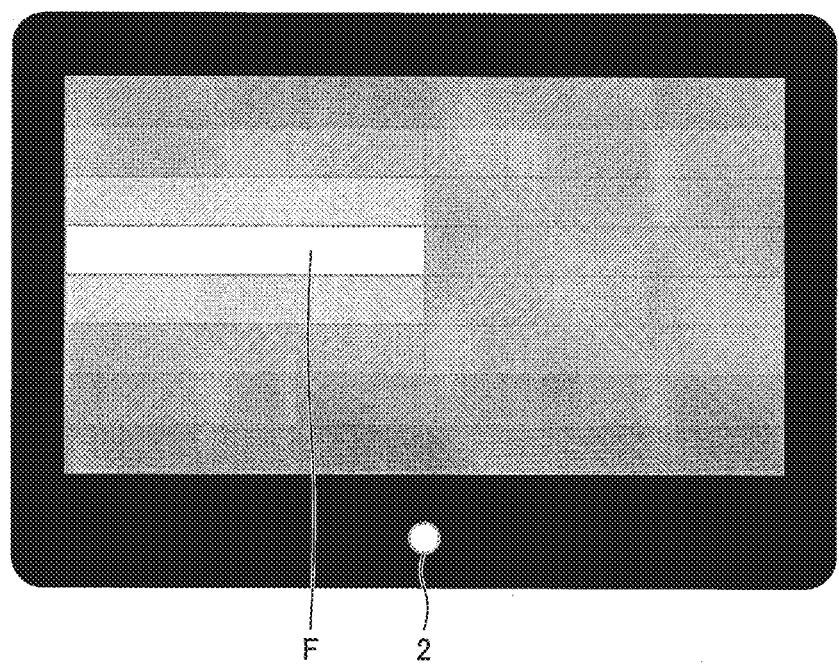
(a)
F  2
(b)
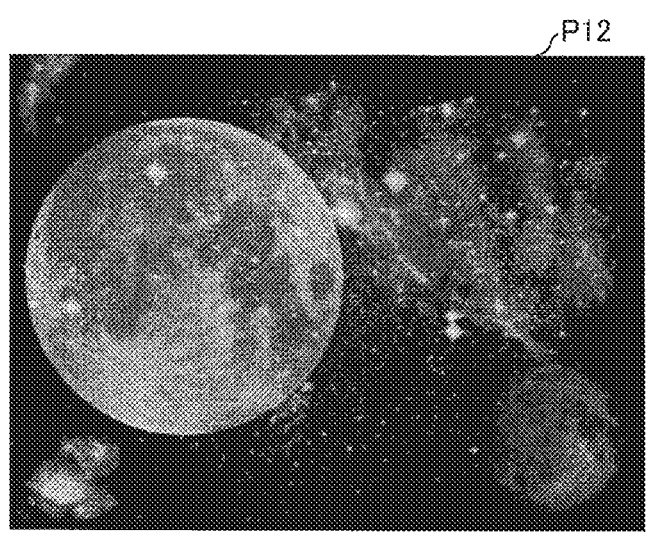
P12

LIGHT SOURCE CONTROL DEVICE, DISPLAY DEVICE, AND IMAGE PROCESSING DEVICE

TECHNICAL FIELD

The following disclosure relates to, among others, light source control devices controlling a light source in a display device.

BACKGROUND ART

Techniques are known that generate a high-dynamic composite image from plural sets of image content that have different luminance levels Image processing devices are also known that subject image content being displayed to image processing in accordance with the user's central point of gaze ("point of gaze") (Patent Literature 1).

Specifically, to generate a high-dynamic composite image, the image processing device described in Patent Literature 1 uses plural sets of image content obtained by continuous shooting with different exposure sensitivities and adjusts luminance across the entire image content in such a manner as to guarantee a certain level of contrast in the central part of the user's field of view. This configuration enables the image processing device to generate a high-dynamic composite image with an enhanced natural appearance near the periphery of the user's point of gaze.

CITATION LIST

Patent Literature

Patent Literature 1: Japanese Unexamined Patent Application Publication, Tokukai, No. 2013-254358A (Publication Date: Dec. 19, 2013)

SUMMARY OF INVENTION

Technical Problem

Since this image processing device cuts and pastes plural sets of image content to generate a high-dynamic composite image, the plural sets of image content needs to be prepared before generating such a high-dynamic composite image. The plural sets of image content may be generated from image content being displayed, which however entails complex image processing. It is therefore difficult to use the image processing device in, for example, television broadcast which requires continuous processing of image data.

The present disclosure, in an aspect thereof, has an object to provide, for example, a light source control device capable of enhancing the contrast of an image by a simple process.

Solution to Problem

To address the problems above, the present disclosure, in an aspect thereof, is directed to a light source control device that controls a plurality of light sources provided in a display device that displays an image by light emitted by the light sources, the light source control device being capable of connecting in a communicable manner to a sensor that detects a point of gaze of a viewer on a display screen of the display device, the light source control device including: a light-emission-intensity determination unit configured to determine a light emission intensity for each of the light sources in such a manner that the light emission intensity of at least one of the light sources that is associated with a range of gaze including the point of gaze detected by the sensor is increased in excess of a light emission intensity specified based on the image; and a light emission control unit configured to control light emission of the light sources based on the light emission intensities determined by the light-emission-intensity determination unit.

To address the problems, the present disclosure, in another aspect thereof, is directed to a method of control implemented by a light source control device to control a plurality of light sources provided in a display device that displays an image by light emitted by the light sources, the light source control device being capable of connecting in a communicable manner to a sensor that detects a point of gaze of a viewer on a display screen of the display device, the method including: the light-emission-intensity determination step of determining a light emission intensity for each of the light sources in such a manner that the light emission intensity of at least one of the light sources that is associated with a range of gaze including the point of gaze detected by the sensor is increased in excess of a light emission intensity specified based on the image; and the light emission control step of controlling light emission of the light sources based on the light emission intensities determined in the light-emission-intensity determination step.

Advantageous Effects of Invention

The present disclosure, in an aspect thereof, can enhance the contrast of an image by a simple process.

Figure 10:
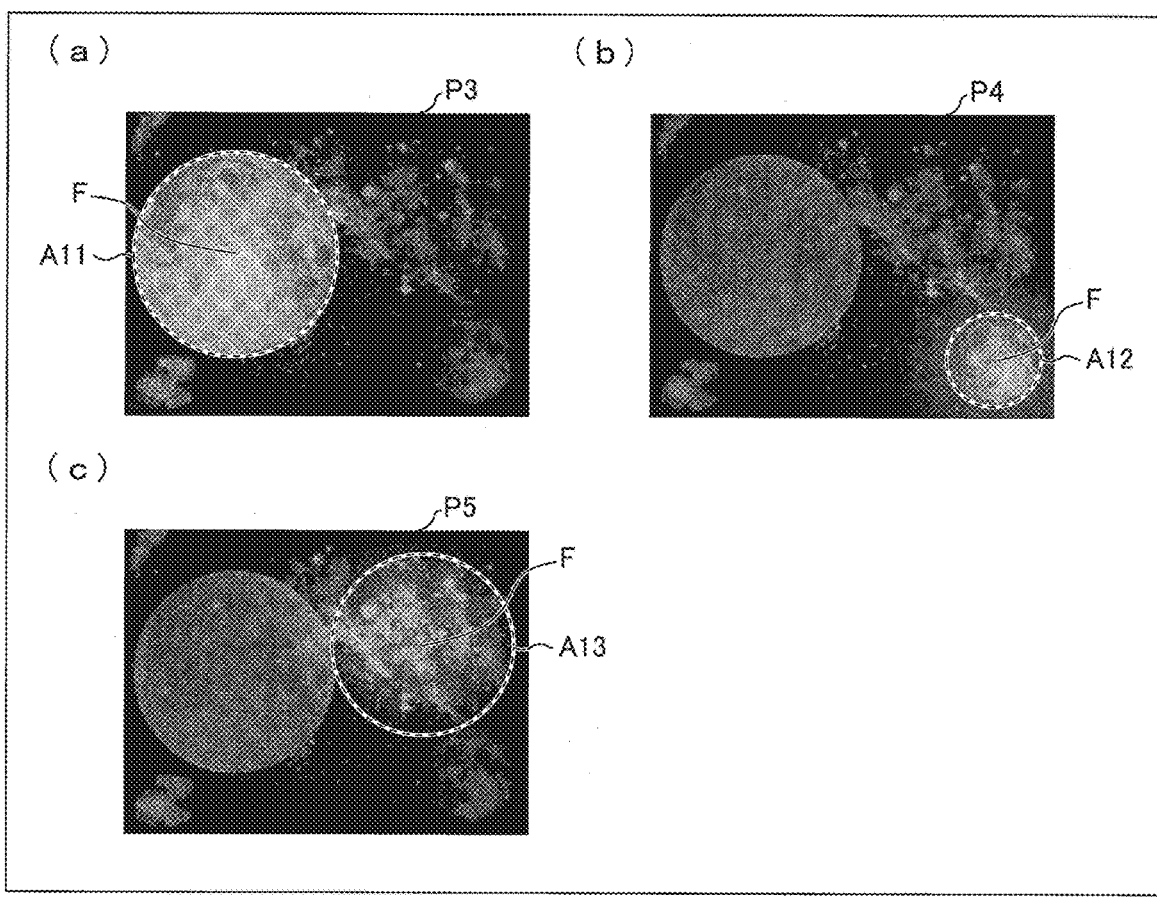

Portions (a) to (c) of FIG. 10 are drawings of example processed HDR display images for different points of gaze F.

Figure 11:
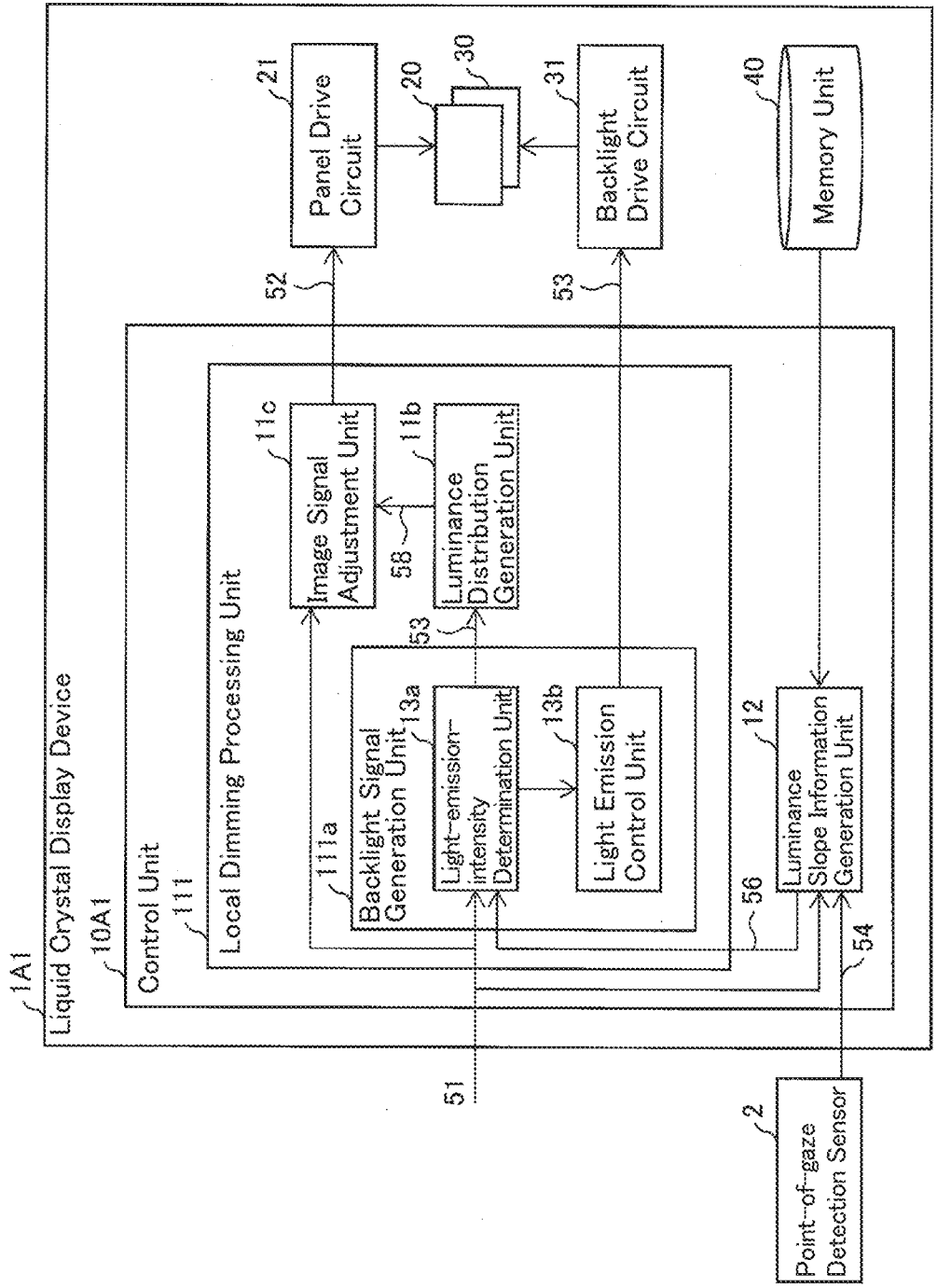

FIG. 11 is a block diagram of a configuration of major components of a liquid crystal display device including a control unit in accordance with a variation example of Embodiment 1 of the present disclosure.

Figure 12:
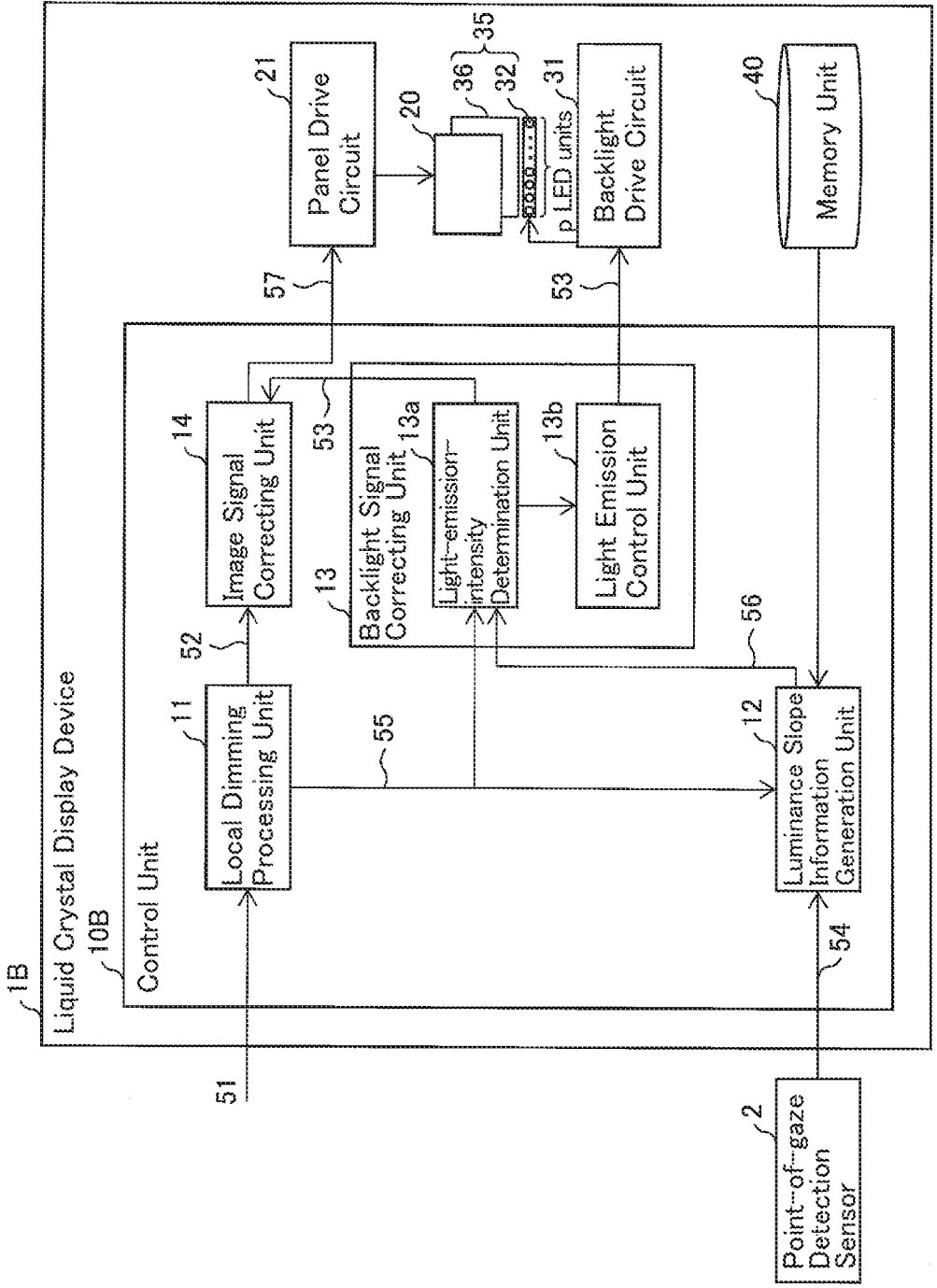

FIG. 12 is a block diagram of a configuration of major components of a liquid crystal display device including a control unit in accordance with Embodiment 2 of the present disclosure.

Portion (a) of FIG. 13 is a visual representation of an example set of luminance slope distribution factor data generated by a luminance slope information generation unit on the basis of point-of-gaze data, and (b) of FIG. 13 is a drawing of an example processed HDR display image.

Figure 14:
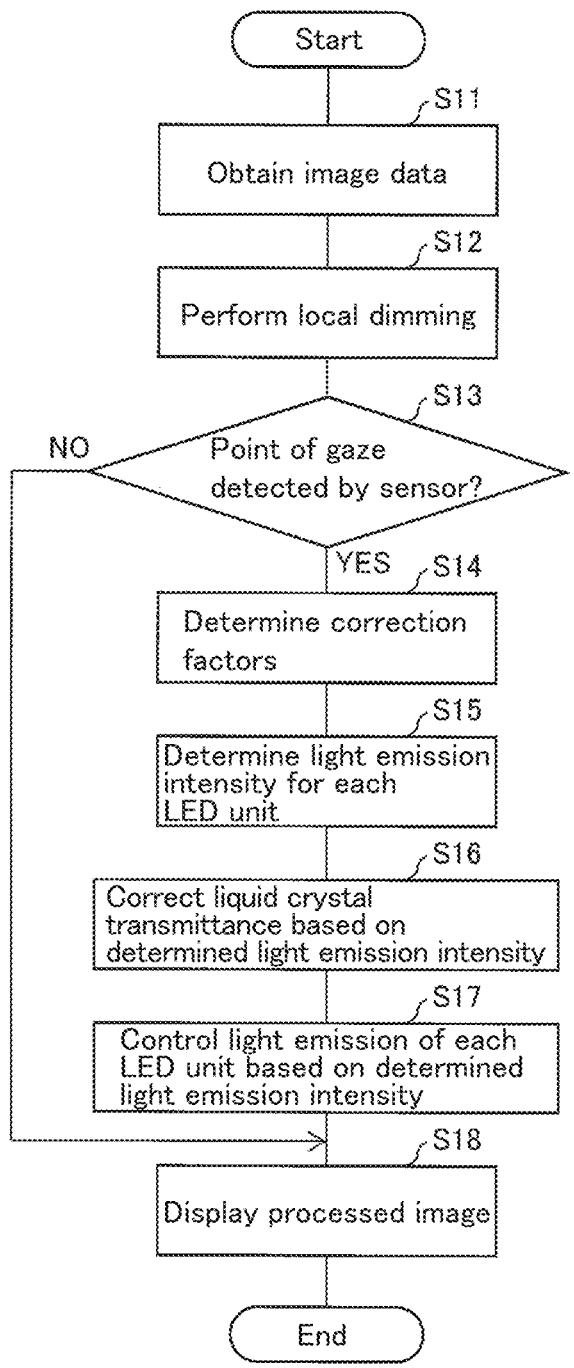

FIG. 14 is a flow chart representing an example process implemented by the control unit in accordance with Embodiment 2 of the present disclosure.

Figure 15:
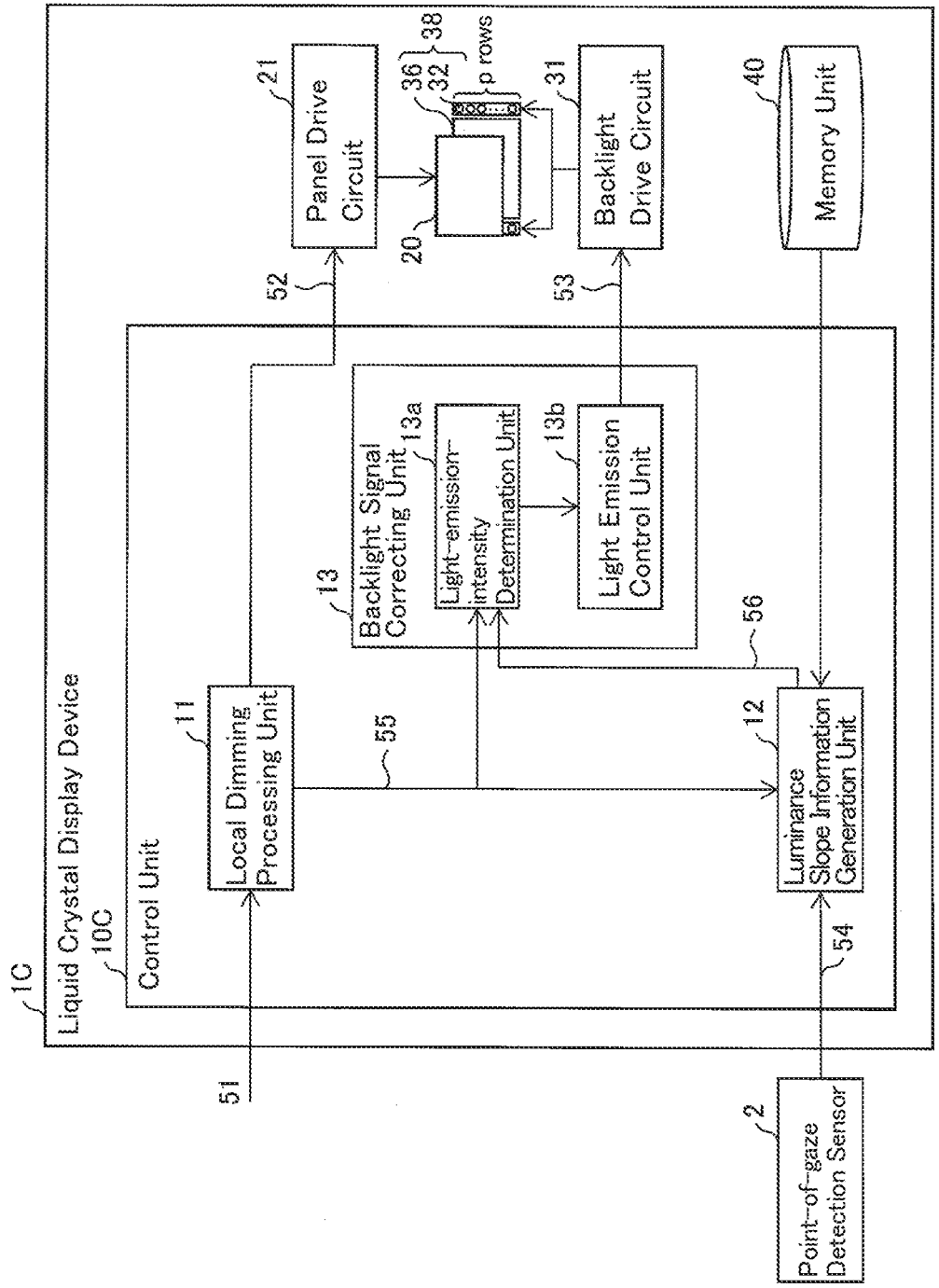

FIG. 15 is a block diagram of a configuration of major components of a liquid crystal display device including a control unit in accordance with Embodiment 3 of the present disclosure.

Portion (a) of FIG. 16 is a visual representation of an example set of luminance slope distribution factor data generated by a luminance slope information generation unit on the basis of point-of-gaze data, and (b) of FIG. 16 is a drawing of an example processed HDR display image.

Figure 17:
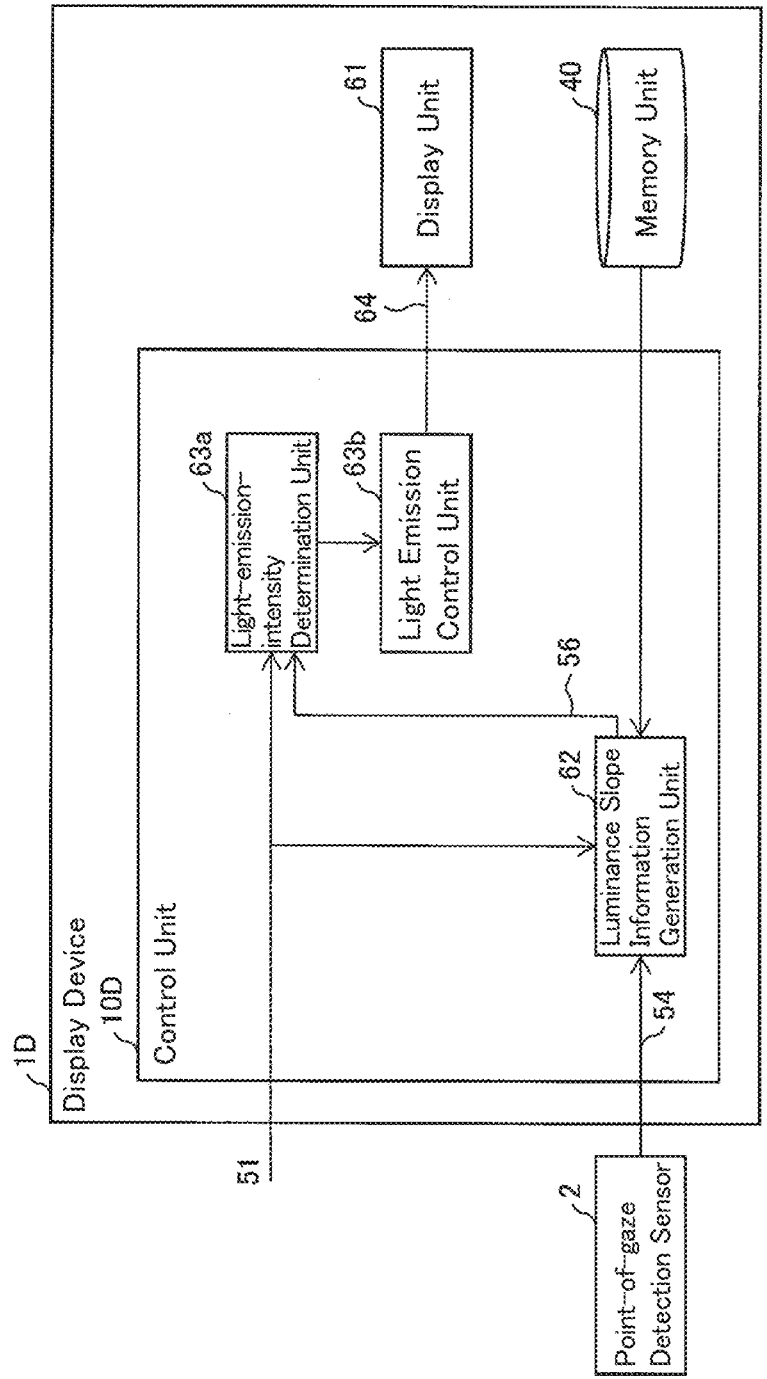

FIG. 17 is a block diagram of a configuration of major components of a liquid crystal display device including a control unit in accordance with Embodiment 4 of the present disclosure.

DESCRIPTION OF EMBODIMENTS

The following will describe embodiments of the present disclosure. Throughout the present application, the notation, "A to B," refers to a numerical range from A to B, both inclusive. Both "p" and "q" are an integer greater than or equal to 1, and either one or both of p and q is/are an integer greater than or equal to 2.

Embodiment 1

A description will be now given of an embodiment of the present disclosure in reference to FIGS. 1 to 10.

The present embodiment will describe, as an example, a light source control device used in a liquid crystal television equipped with a common LED (light emitting diode) backlight. The light source control device in accordance with an aspect of the present disclosure is by no means limited to this example. Alternatively, the light source control device may be used to control a light source, for example, for a monitor of a personal computer or for a display device such as a tablet or a smartphone. The present embodiment will also describe a liquid crystal display device as an example of a display device for displaying images using light emitted by a plurality of light sources. The display device in which a light source control device in accordance with an aspect of the present disclosure is used is by no means limited to this example. Alternatively, the light source control device may be used, for example, in a field emission display (FED).

Incidentally, standardization work has been under way on HDR (high dynamic range)-based television broadcasting for better texture or live feel reproduction. HDR-based standards (e.g., ST2084 suggested by Dolby Laboratories, Inc. and others) use images with a far broader dynamic range (HDR images) than conventional standards. Active research and development is taking place for display devices capable of such an HDR.

The following description assumes that a liquid crystal display device 1A in accordance with the present embodiment is able to display HDR images and to receive image data signals representing HDR images. The light source control device in accordance with an aspect of the present disclosure can also be used when the liquid crystal display device 1A receives image data signals that comply with conventional standards (SDR) to display SDR images represented by the image data signals. The light source control device can also be used to display SDR images as pseudo-HDR images.

Throughout the following description, an image data signal representing an HDR image may be referred to as an HDR signal, and image data in each frame of an HDR signal fed to a liquid crystal display device may be referred to as an HDR input image. In addition, an image displayed on a display screen of a liquid crystal display device (display device) on the basis of an HDR input image may be referred to as an HDR display image.

Structure of Liquid Crystal Display Device 1A

Figure 1:
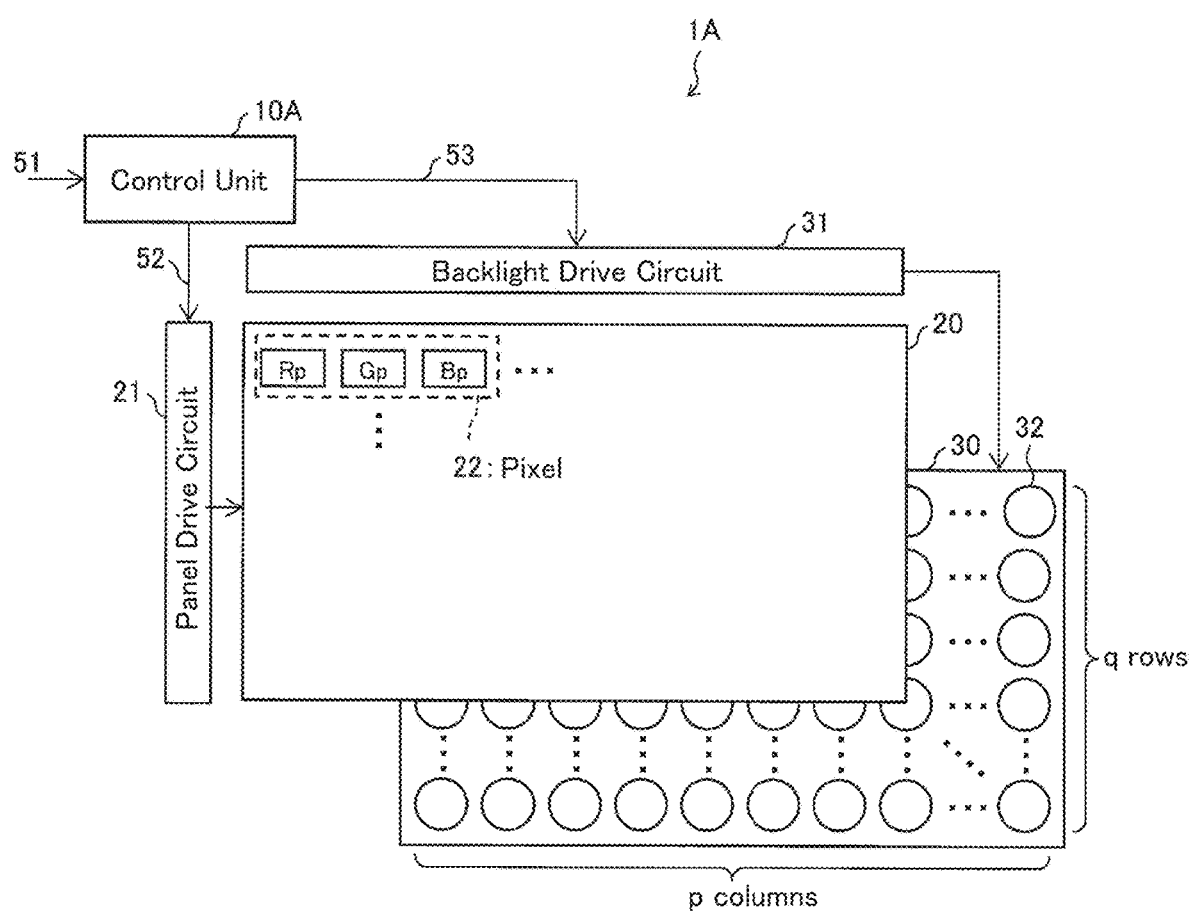
FIG. 1 is a schematic block diagram of a structure of a liquid crystal display device in accordance with Embodiment 1 of the present disclosure.

Referring to FIG. 1, a brief description will be given first of a structure of the liquid crystal display device 1A (display device) in accordance with the present embodiment in order to facilitate understanding of a light source control device in accordance with an aspect of the present disclosure (a control unit 10A provided in the liquid crystal display device 1A). FIG. 1 is a schematic block diagram of a structure of the liquid crystal display device 1A in accordance with the present embodiment.

The liquid crystal display device 1A, as shown in FIG. 1, includes the control unit 10A, a liquid crystal panel 20, a panel drive circuit 21 that drives the liquid crystal panel 20, a backlight 30 that illuminates the liquid crystal panel 20, and a backlight drive circuit 31 that drives the backlight 30. The backlight 30 includes a plurality of LED units 32 (light source) arranged on the rear face of the liquid crystal panel 20. The liquid crystal display device 1A displays images by using the light emitted by the LED units 32.

The liquid crystal display device 1A divides the display screen of the liquid crystal panel 20 into a plurality of areas (regions) to control local dimming on the basis of HDR input images each associated with a different region. Specifically, the liquid crystal display device 1A controls the light emission intensity of each LED unit 32 associated with one of the regions and at the same time controls the liquid crystal panel 20 for the region in accordance with the light emission intensity of the LED unit 32.

Local dimming (partial driving) is a technique popularly used to display HDR images on the display screen of the liquid crystal panel 20, that is, to display grayscale images on the display screen with a broad range of brightness. In particular, the liquid crystal display device 1A includes the direct backlight 30 including the LED units 32 on the bottom face (rear face) of the liquid crystal panel 20. By modulating the light emission intensity (brightness) of each LED unit 32, the luminance distribution of the backlight 30 can be controlled so as to improve the contrast of the HDR display image displayed on the display screen.

The HDR input image (image to be displayed) represented by an HDR signal 51 fed to the liquid crystal display device 1A is composed of a plurality of picture elements. Each picture element is expressed using a combination of three gray levels that correspond respectively to the three primary colors (R, G, and B), or color components, of light.

In other words, each picture element in the HDR input image is expressed using gray levels that correspond to respective colors.

Specifically, an HDR input image contains, for each picture element, a red gray level for specifying a gray level for red, a green gray level for specifying a gray level for green, and a blue gray level for specifying a gray level for blue. Each gray level is represented by 12-bit data in the present embodiment. The gray levels contained in the HDR input image represented by the HDR signal 51 may alternatively be represented by any other number of bits (e.g., 10-bit data).

The control unit 10A determines display-use data for use in driving the liquid crystal panel 20 (hereinafter, "liquid crystal grayscale data 52") and light emission luminance control data for use in driving the backlight 30 (hereinafter, "LED luminance data 53"), both on the basis of the HDR input image represented by the HDR signal 51. The processes implemented by the control unit 10A in accordance with the present embodiment will be described later in detail.

The liquid crystal panel 20 includes a plurality of pixels 22 arranged, for example, in a matrix. Each pixel 22 includes a plurality of subpixels (display elements): namely, a red pixel Rp, a green pixel Gp, and a blue pixel Bp. The liquid crystal panel 20 may include subpixels of a color other than red, green, and blue, such as yellow pixels and white pixels. The pixel 22 may include more than one red, green, or blue subpixel for color balance adjustment. As an example, the pixel 22 may include Rp, Gp1, Gp2, and Bp.

The panel drive circuit 21 is a drive circuit for the liquid crystal panel 20. The panel drive circuit 21 outputs, to the liquid crystal panel 20, signals (voltage signals) for controlling the optical transmittances of the subpixels on the basis of the liquid crystal grayscale data 52 fed from the control unit 10A.

The backlight 30 includes a two-dimensional array of p×q LED units 32 arranged in p columns and q rows. Note that the LED units 32 may be arranged in any manner.

The LED unit 32 of the present embodiment is a white LED formed from a blue LED in combination with a fluorescent material. Note that the LED unit 32 may have any structure and may be formed from any device. The LED unit 32 may include a red LED, a green LED, and a blue LED (none shown) and may include more than one red, green, or blue LED. As a further alternative, the LED unit 32 may include a magenta LED and a green LED, the magenta LED being formed from a blue LED in combination with a red fluorescent material.

The backlight drive circuit 31 is a drive circuit for the backlight 30. The backlight drive circuit 31 outputs, to each LED unit 32, drive signals (pulse signals or electric current signals) on the basis of the LED luminance data 53 fed from the control unit 10A. In other words, each LED unit 32 is controlled independently from the other LED units 32.

The display screen of the liquid crystal display device 1A is divided into p×q regions each associated with a different one of the LED units 32. Alternatively, a region may be associated with two or more LED units (a pair or set of LED units).

For each one of the p×q regions, the control unit 10A determines a first light emission intensity for the LED unit 32 that is associated with the region on the basis of the picture element in the HDR input image that is associated with the region. The first light emission intensity of each LED unit 32 may be determined on the basis of an HDR input image by, for example, a design engineer of the device determining specifications as to what HDR display image should be displayed or by a viewer, for example, adjusting image quality. The first light emission intensity of the LED unit 32 determined in this manner is referred to as a "light emission intensity specified on the basis of an image" in the present specification.

As will be described later in detail, the control unit 10A determines, for each region, a second light emission intensity for the LED unit 32 that is associated with the region by multiplying the first light emission intensity of the LED unit 32 by a correction factor. The control unit 10A outputs the second light emission intensity of all the LED units 32 as the LED luminance data 53.

The first light emission intensity and the second light emission intensity may be described as follows. The first light emission intensity and the second light emission intensity may be given as proportions ("luminance proportions") of the luminance of the LED unit 32 achieved during actual light emission to a maximum luminance of the LED unit 32. The LED unit 32 has a maximum luminance that may be determined in advance as a part of the device specifications using (i) a maximum electric current that can flow through the LED unit 32, (ii) a maximum electric power that can be used by the backlight 30, and (iii) the capability of a power supply circuit. Thus, the present invention will be appreciated by substituting the first luminance proportion and the second luminance proportion for each occurrence of the first light emission intensity and the second light emission intensity respectively in the present specification where appropriate.

The subpixel Rp has luminance that may vary with a product of the intensity of light incident to the subpixel Rp and the optical transmittance of the subpixel Rp. The same description applies equally to the other subpixels Gp and Bp. This example disregards, among others, the decay of light in various other members such as a polarizer for the purpose of simple description. Each LED unit 32 emits and superimposes light over the light cast by the other LED units 32, which makes up the illuminance distribution of the liquid crystal panel 20. The intensity of light incident to each subpixel is determined on the basis of this illuminance distribution.

The liquid crystal display device 1A has been so far described which includes a light source control device (control unit 10A) in accordance with an aspect of the present disclosure, by referring to FIG. 1. Now, referring to FIG. 2, a description will be given of issues of the conventional liquid crystal display device that is adapted to handle HDR signals, in order to facilitate understanding of a light source control device (control unit 10A) in accordance with an aspect of the present disclosure.

Issues of Conventional Liquid Crystal Display Devices

Figure 2:
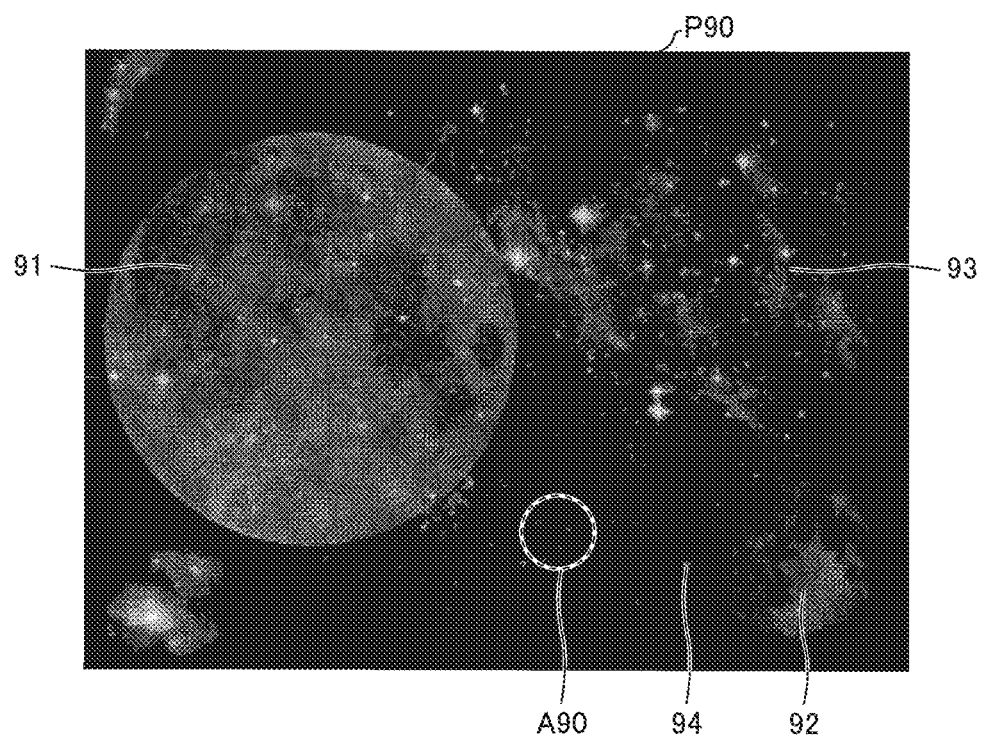
FIG. 2 is a drawing of an example HDR input image, which illustrates issues of conventional liquid crystal display devices.

FIG. 2 is a drawing of an example HDR input image, which illustrates issues of conventional liquid crystal display devices. In this context, the liquid crystal television as an example of the conventional liquid crystal display device has the same structure as the liquid crystal display device 1A described above, except that the control unit 10A is replaced by a local dimming processing unit that performs local dimming on the basis of the HDR signal 51. In other words, the LED units are controlled on the basis of the first light emission intensity.

The conventional liquid crystal television does not have sufficient luminance to faithfully reproduce the dynamic range of an HDR input image represented by the HDR signal 51 in the display of the HDR input image. One of reasons for this is that the conventional liquid crystal television can use a limited amount of electric power (i.e., is not allowed to use electric power beyond a prescribed maximum level).

For example, if the HDR input image has a high average luminance level (APL), there may not be sufficient electric power available to adequately increase the peak luminance of the HDR display image (adequately increase the light emission intensity of LED units). In other words, the total power consumption of the backlight in the conventional liquid crystal television may reach a prescribed maximum level (rated electric power).

When that actually happens, it becomes impossible to increase the peak luminance by partial control of the backlight. In other words, there is no more electric power available to further increase the light emission intensity of the LED units in some regions, thereby failing to increase the peak luminance of the HDR display image. The HDR display image is therefore inevitably displayed on the display screen with a reduced peak luminance (by clipping luminance in high luminance regions). Meanwhile, the luminance of the backlight decreases also in low gray level regions of the HDR display image, resulting in blocked shadows. For these reasons, the conventional liquid crystal television fails to fully exploit HDR effects of the HDR input image (i.e., fails to sufficiently reproduce the HDR) in the display of the HDR display image. These issues can be exacerbated, for example, with home-use liquid crystal televisions that come with an increasingly large display screen because these televisions have limited electric power available for consumption and are often sitting in a bright environment.

The limited power consumption may also be due to the limited thermal resistance of the backlight and the limited capability of the LED driver.

As another example, assume that an HDR input image P90 shown in FIG. 2 is fed to the conventional liquid crystal television. The HDR input image P90 shows celestial objects such as a relatively large, first planet 91, a relatively small, second planet 92, a nebula 93, and a group of scattered fixed stars 94 on the background of the dark cosmos. The HDR input image P90 appears dark overall (has low RGB gray levels), but includes many bright local spots (where RGB gray levels are high).

The local dimming processing unit controls the LED units in the backlight separately for each region. If there is a region that includes even a small number of picture elements where any of RGB gray levels is high, the local dimming processing unit controls the LED unit associated with the region so as to increase the light emission intensity of the LED unit. Therefore, the local dimming processing unit, upon receiving the HDR input image P90, increases the light emission intensity of the LED units in the regions that include bright local spots. For example, the backlight LEDs associated with a region A90 where the fixed stars 94 are scattered in the dark space are turned on with some output level. As a result, the average luminance level of the backlight (i.e., the average light emission intensity of the LED units) becomes higher than the average luminance level of the picture elements in the HDR input image P90.

Consequently, the conventional liquid crystal television may have the following problems if it receives the HDR input image P90. Specifically, if the light emission intensity of the LED units is to be specified so as to faithfully reproduce the dynamic range of the HDR input image, the conventional liquid crystal television will need to consume more electric power than the allowed maximum consumption level. This lack of sufficient electric power would force the peak luminance of the HDR display image to be lowered.

When this actually happens, the conventional liquid crystal television fails to fully exploit HDR effects of the HDR input image P90 in the display of the HDR input image P90.

Details of Light Source Control Device in Accordance with an Aspect of Present Disclosure The liquid crystal display device 1A, which includes the control unit 10A (light source control device) in accordance with an aspect of the present disclosure, performs a process to increase the light emission intensity of the LED units 32 associated with a region (range of gaze) that contains a viewer's line of sight (point of gaze) detected by a point-of-gaze detection sensor 2 (sensor). This process increases the peak luminance of the HDR display image in a region of gaze (viewer's point of gaze and its surroundings) and its surrounding regions of the display screen. The process, although simple, is able to enhance the contrast of the image. In other words, the process can bring the contrast of the HDR display image in the region of gaze and its surrounding regions (range of gaze) closer to the contrast of the HDR input image.

Figure 3:
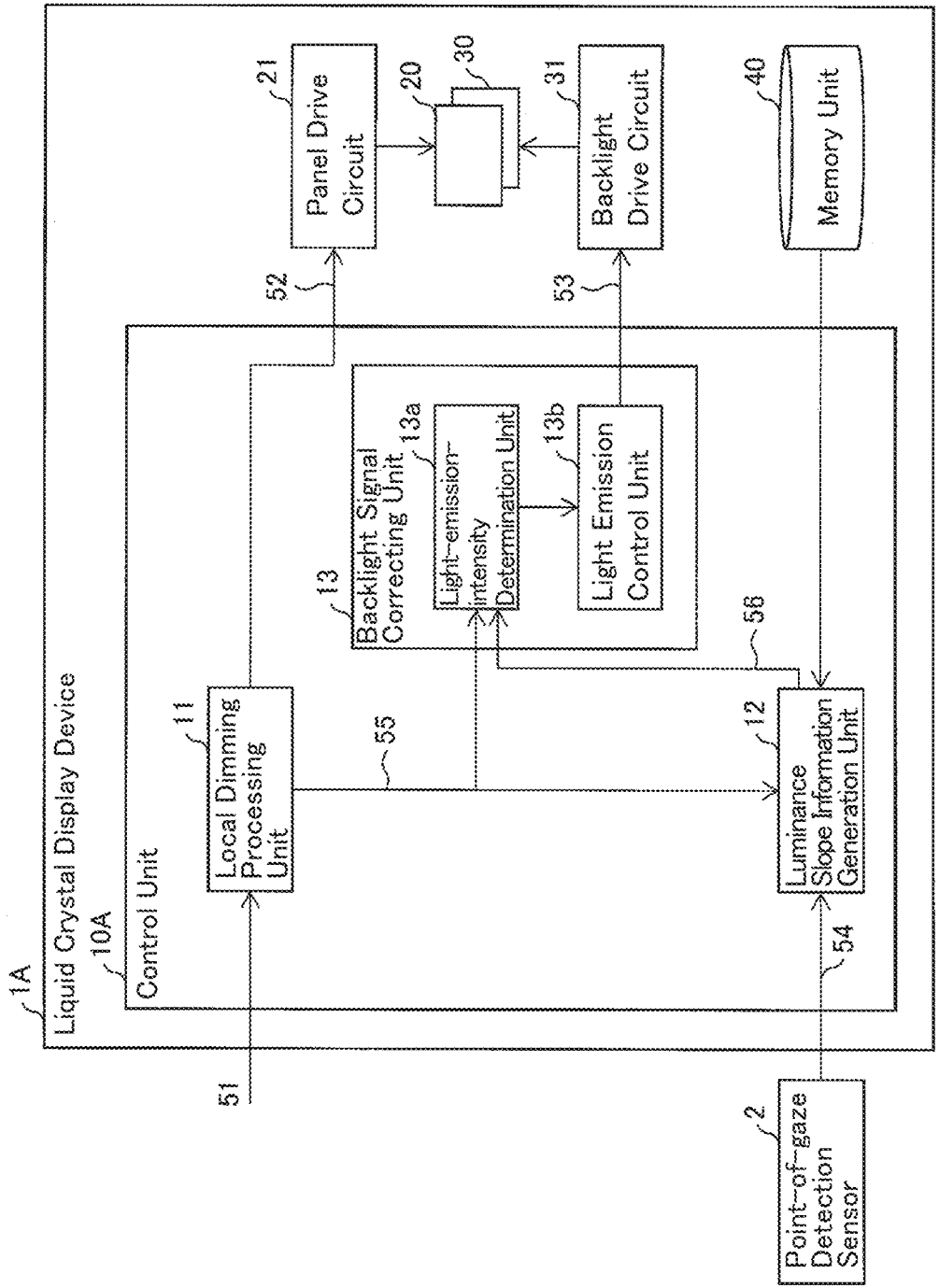
FIG. 3 is a block diagram of a configuration of major components of a liquid crystal display device including a control unit in accordance with Embodiment 1 of the present disclosure.
Figures 4, 5:
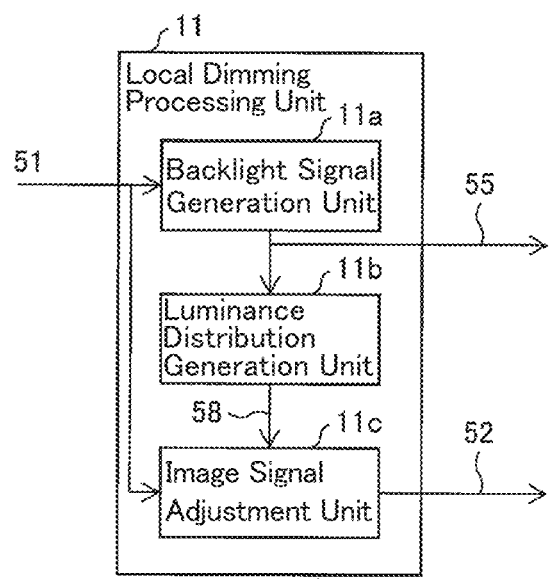
FIG. 4 is a block diagram of a configuration of major components of a local dimming processing unit in accordance with Embodiment 1 of the present disclosure.
FIG. 5 is schematic diagrams showing example sets of luminance slope distribution factor data, portion (a) showing such an example when a viewer gazes at a relatively bright area of the image displayed on a display screen and portion (b) showing such an example when a viewer gazes at a relatively dark area of the image displayed on a display screen.

The following will describe a configuration of the control unit 10A (light source control device) in accordance with the present embodiment in reference to FIGS. 3 to 5. FIG. 3 is a block diagram of a configuration of major components of the liquid crystal display device 1A in accordance with the present embodiment. FIG. 4 is a block diagram of a configuration of major components of a local dimming processing unit 11 in accordance with the present embodiment. FIG. 5 is schematic diagrams showing example sets of luminance slope distribution factor data.

Referring to FIGS. 3 and 4, the liquid crystal display device 1A includes the control unit 10A, the liquid crystal panel 20, the panel drive circuit 21, the backlight 30, the backlight drive circuit 31, and a memory unit 40. The control unit 10A can be connected to the point-of-gaze detection sensor 2 (sensor) in a communicable manner.

The point-of-gaze detection sensor 2 detects a viewer's point of gaze on the display screen and transmits point-of-gaze data 54 representing the detected point of gaze to a luminance slope information generation unit 12 (correction information generation unit). The point-of-gaze detection sensor 2 may include, for example, an eye tracker by detecting the movement of a viewer's line of sight, for example, by detecting the movement of the viewer's eyeballs. The position of the point of gaze is denoted, for example, by x and y coordinates that may be arbitrarily set up on the display screen.

The liquid crystal display device 1A may include the point-of-gaze detection sensor 2. The point-of-gaze detection sensor 2 may be provided in any location.

The control unit 10A generally controls the liquid crystal display device 1A. Especially, in the present embodiment, the control unit 10A has image processing and light source control functions by which prescribed processes are performed on the HDR input image in each frame given by the HDR signal 51, in order to control the LED units 32 on the basis of the processes. The control unit 10A includes the local dimming processing unit 11, the luminance slope information generation unit 12, and a backlight signal correcting unit 13. The backlight signal correcting unit 13 includes a light-emission-intensity determination unit 13a and a light emission control unit 13b.

The control unit 10A includes at least the local dimming processing unit 11 as the aforementioned image processing function and further includes at least the luminance slope information generation unit 12 and the backlight signal correcting unit 13 as the aforementioned light source control function.

The luminance slope information generation unit 12 and the backlight signal correcting unit 13 perform processes in the control unit 10A of the present embodiment when there is a single viewer. To put it differently, the liquid crystal display device 1A performs none of the processes if the point-of-gaze detection sensor 2 has determined, for example, by means of a face detection function by which a viewer's face is detected, that there are two or more viewers watching the display screen.

Alternatively, if there are two or more viewers watching the display screen, the control unit 10A may perform the processes after identifying (distinguishing between) the viewers by means of a face detection function. For example, (i) one of the viewers may be identified as a main viewer on the basis of viewer priority stored in the memory unit 40 in advance or (ii) a viewer who is relatively in front of the liquid crystal display device 1A may be identified as a main viewer. In these cases, the processes may be performed on the basis of the point of gaze of the main viewer.

As a further alternative, the control unit 10A may be provided external to the liquid crystal display device 1A, in which case the control unit 10A is connected to the liquid crystal display device 1A in a communicable manner to transmit the liquid crystal grayscale data 52 and the LED luminance data 53 to the liquid crystal display device 1A. Additionally, a light source control device (control unit 10A) in accordance with an aspect of the present disclosure needs to include at least the luminance slope information generation unit 12 and the backlight signal correcting unit 13. Therefore, the liquid crystal display device 1A may include the local dimming processing unit 11, but neither the luminance slope information generation unit 12 nor the backlight signal correcting unit 13.

The control unit 10A may not include the luminance slope information generation unit 12, with the light-emission-intensity determination unit 13a in the backlight signal correcting unit 13 functioning as the luminance slope information generation unit 12.

The memory unit 40 contains, for example, various control programs executed by the control unit 10A and includes a hard disk, flash memory, or like non-volatile storage device.

The HDR signal 51 fed to the liquid crystal display device 1A is described as being moving image data, but may be still image data. Each HDR input image (each frame image), which is a moving image, is subjected to the image processing detailed later.

The HDR signal 51 may be a data signal obtained from a broadcast wave that complies with HDR-based standards. Alternatively, the HDR signal 51 may be a data signal obtained from an external device (e.g., video recording device) that contains or generates still image data or moving image data and that is connected to the liquid crystal display device 1A.

Local Dimming Processing Unit 11

The local dimming processing unit 11 includes a backlight signal generation unit 11a, a luminance distribution generation unit 11b, and an image signal adjustment unit 11c. The local dimming processing unit 11 performs processes by publicly known methods, which are only briefly described in the following.

The backlight signal generation unit 11a obtains an HDR input image from the HDR signal 51 that is fed to the liquid crystal display device 1A and generates a backlight signal 55 on the basis of the image. Specifically, the backlight signal generation unit 11a divides the HDR input image into p×q regions and determines a first light emission intensity for the LED unit 32 in each region on the basis of the image in the region (RGB gray levels of a group of picture elements in the region). In other words, the backlight signal 55 is data related to the first light emission intensity of each of the p×q LED units 32.

The first light emission intensity may be determined by a method that is specified in a suitable manner. The first light emission intensity may be determined, for example, from average or maximum luminance (RGB gray levels) of a group of picture elements in the region. As other alternatives, the first light emission intensity of each LED unit 32 may be calculated by computation and may be determined by retrieving, from the memory unit 40, value settings predetermined on the basis of picture elements in each region.

The backlight signal 55 is transmitted to the backlight signal correcting unit 13 and the luminance distribution generation unit 11b. The luminance distribution generation unit 11b estimates the luminance distribution of the backlight 30 (first luminance distribution) for a case where each LED unit 32 emits light with the first light emission intensity. Based on this estimate, the luminance distribution generation unit 11b converts the backlight signal 55 to generate luminance distribution data 58. In other words, the luminance distribution data 58 is data related to the estimated luminance distribution of the backlight 30. This estimating of luminance distribution may be carried out by computation or by retrieving a luminance distribution that is measured or estimated in advance for the light emission intensity of each LED unit 32 and stored in advance in the memory unit 40.

The luminance distribution data 58 is transmitted to the image signal adjustment unit 11c. The image signal adjustment unit 11c generates the liquid crystal grayscale data 52 on the basis of the HDR signal 51 and the luminance distribution data 58. Specifically, the image signal adjustment unit 11c divides the luminance (RGB gray levels) of a certain picture element in an HDR input image represented by the HDR signal 51 on the basis of the luminance distribution data 58 by using the amount of light in a position that corresponds to the picture element. This process determines a transmittance for the subpixels Rp, Gp, and Bp in the position that corresponds to the picture element on the display screen. The process is carried out on each picture element in the HDR input image to calculate information on the transmittance of each subpixel of the liquid crystal panel 20. This information is the liquid crystal grayscale data 52.

The method described above is a mere example. The liquid crystal grayscale data 52 may be generated by an algorithm (calculation method) that is specified in a suitable manner.

The local dimming processing unit 11 generates, in this manner, the liquid crystal grayscale data 52 used in driving the liquid crystal panel 20 and the backlight signal 55 on the first light emission intensity of the LED units 32 in the backlight 30. The liquid crystal grayscale data 52 is transmitted to the panel drive circuit 21, and the backlight signal 55 is transmitted to the luminance slope information generation unit 12 and the backlight signal correcting unit 13.

Luminance Slope Information Generation Unit 12

The luminance slope information generation unit 12 receives the point-of-gaze data 54 on a viewer's point of gaze on the display screen, the point-of-gaze data 54 being detected by the point-of-gaze detection sensor 2 provided outside the liquid crystal display device 1A.

In the present embodiment, the luminance slope information generation unit 12 (correction information generation unit) recognizes the individual p×q regions formed by dividing the display screen into a matrix of regions. Therefore, the luminance slope information generation unit 12 can recognize a region containing a point of gaze as a region of gaze. The luminance slope information generation unit 12 generates luminance slope distribution factor data 56 (correction information) on the basis of the point-of-gaze data 54 and the backlight signal 55.

The luminance slope distribution factor data 56 of the present embodiment is a set of correction factors applied to the LED units 32 and specified in the following manner. In other words, the luminance slope distribution factor data 56 is a set of correction factors specified to increase the luminance of at least those LED units 32 associated with the region of gaze in such a manner that the ratio of the first light emission intensity to the second light emission intensity becomes larger (the value of the correction factor becomes smaller) for the LED unit 32 located in a region farther away from the region of gaze.

Correction of the backlight signal 55 using this luminance slope distribution factor data 56 can darken the outer regions, or all the regions excluding the region of gaze and its surrounding regions (lower the outputs of the LED units 32 in the outer regions). Resultant electric power savings may be used to increase the outputs (light emission intensity) of the LED units 32 in the region of gaze and its surrounding regions. A region of gaze and its surrounding regions may be collectively referred to as a range of gaze throughout the following description.

It may be determined in a suitable manner how large or small a range of gaze should be. The range of gaze may be specified in accordance with an object contained in the HDR input image. Additionally, the range of gaze may cover the same area as a region of gaze.

The sum of the outputs (second light emission intensity) of the LED units 32 that are determined in accordance with the LED luminance data 53 generated by correcting the backlight signal 55 needs not to exceed a prescribed maximum level that is determined in accordance with specifications and other requirements of the liquid crystal display device 1A.

Therefore, the correction factors in the luminance slope distribution factor data 56 are generated in such a manner that the total power consumption of the LED units 32 in the backlight 30 does not exceed the prescribed maximum level. Hence, the light-emission-intensity determination unit 13a can determine the output (second light emission intensity) of each LED unit 32 in such a manner that the power consumption for achieving the light emission intensity does not exceed the prescribed maximum level.

The luminance slope information generation unit 12 may alternatively generate the correction factors in the luminance slope distribution factor data 56 in such a manner that the sum of the output (second light emission intensity) of each LED unit 32 given by the LED luminance data 53 is smaller than the sum of the output (first light emission intensity) of each LED unit 32 given by the backlight signal 55. Hence, the power consumption of the liquid crystal display device 1A can be lowered.

The luminance slope information generation unit 12 may change the luminance slope distribution factor data 56 in accordance with whether the average luminance of a group of picture elements in the region of gaze is high or low (whether the region of gaze is bright or dark).

The luminance slope information generation unit 12 may then change the luminance slope distribution factor data 56 in accordance with the average luminance level of all the picture elements in the HDR input image for the following reasons. For example, if the group of picture elements in the HDR input image has a low average luminance level, lowering the power consumption of the LED units 32 in the outer regions may not save sufficient electric energy, which could put a limit on sufficient increasing of the luminance of the range of gaze. The possibility of putting such a limit can be lowered by changing the luminance slope distribution factor data 56 as described here.

Alternatively, the luminance slope information generation unit 12 may change the luminance slope distribution factor data 56 for each HDR input image in the HDR signal 51. In such cases, the luminance slope distribution factor data 56 can be changed on the basis of the average luminance level of the picture elements in the HDR input image for each frame of the HDR signal 51.

The luminance slope information generation unit 12 may not generate the luminance slope distribution factor data 56 for all the frames (for the entire HDR input image) and may update the luminance slope distribution factor data 56 at prescribed frame intervals. By not having to frequently change the luminance slope distribution factor data 56 in accordance with the viewer's point of gaze and the HDR input image when the viewer is watching the display screen, the HDR display image can be displayed more stably.

A description will be given of an example set of the luminance slope distribution factor data 56 in reference to FIG. 5. FIG. 5 is schematic diagrams showing example sets of the luminance slope distribution factor data 56. For convenience of description, the luminance slope distribution factor data 56 includes 5×5 correction factors in this example. The luminance slope distribution factor data 56 may be a set of p×q factors if the luminance slope information generation unit 12 divides the display screen into, for example, p×q regions and recognizes these regions. As an alternative, the luminance slope information generation unit 12 may divide the display screen into blocks that are larger in size than the regions (e.g., each block is equivalent to 2×2 regions). If, for example, n×n regions form a single block, the luminance slope distribution factor data 56 may be a set of (p/n)×(q/n) factors.

If it is determined that the gray level of the HDR input image associated with the recognized region of gaze is greater than or equal to a prescribed value, the luminance slope information generation unit 12 determines that this region is relatively bright. On the other hand, if it is determined that the gray level is smaller than the prescribed value, the luminance slope information generation unit 12 determines that the region is relatively dark.

Portion (a) of FIG. 5 shows an example set of the luminance slope distribution factor data 56 when a viewer gazes at a relatively bright area (relatively high luminance region) in the HDR input image. In this example, the region of gaze is located near center of the display screen and matches the range of gaze.

As shown in (a) of FIG. 5, as an example, the luminance slope distribution factor data 56 may give a correction factor of 1.5 for the region of gaze, a correction factor of 1 for first regions that are adjacent vertically, horizontally, or obliquely to the region of gaze, and a correction factor of 0.5 for regions located far from the region of gaze (second regions adjacent externally to the first regions). This setting of the correction factor to a value between 0 to 1 in the second regions lowers the light emission intensity of the LED units 32 in the second regions, thereby reducing power consumption in the second regions. The electric power savings can be used to increase the light emission intensity of the LED units 32 associated with the region of gaze, which increases the peak luminance in the region of gaze.

The relation, 16(0.5 A)≥0.5 B, needs to be satisfied, however, to achieve a factor of 1.5 for the region of gaze. For the example shown in (a) of FIG. 5, A is the power consumption of the outermost LED units 32 associated with the second regions, and B is the power consumption of the LED units 32 associated with the region of gaze. In other words, to multiply the luminance of the LED units 32 in the region of gaze by a factor of 1.5 in the example in (a) of FIG. 5, the first light emission intensity of the LED units 32 in the region of gaze (light emission intensity in the backlight signal 55) needs not to exceed 16 times the first light emission intensity of the outermost LED units 32.

If the first light emission intensity of the LED units 32 in the region of gaze exceeds 16 times the first light emission intensity of the outermost LED units 32, the luminance slope information generation unit 12 generates the luminance slope distribution factor data 56, for example, by (i) further reducing the correction factors for the second regions (reducing it below 0.5) or (ii) further reducing the correction factors for the first regions (reducing it below 1).

Portion (b) of FIG. 5 shows an example set of the luminance slope distribution factor data 56 when a viewer gazes at a relatively dark area (relatively low luminance region) in the HDR input image.

As shown in (b) of FIG. 5, as an example, the luminance slope distribution factor data 56 may give a correction factor of 1.2 for the region of gaze, a correction factor of 1 for the first regions, and a correction factor of 0.8 for the second regions. Each correction factor has a range, or a difference between its maximum and minimum values, that is smaller than in (a) of FIG. 5. The range may be regarded as an inclination of the correction factor and referred to as an angle of inclination.

When the region of gaze in an HDR input image is dark, a power shortage would rarely occur. In contrast, if luminance is excessively increased in a dark area in the HDR input image, the HDR display image may have an unnatural appearance. As described earlier, if it is determined that the area of the HDR input image that corresponds to the region of gaze is relatively dark, the luminance slope information generation unit 12 generates the luminance slope distribution factor data 56 with a small angle of inclination. Such data 56 can lower the possibility of the HDR display image having an unnatural appearance.

Backlight Signal Correcting Unit 13

The backlight signal correcting unit 13 corrects the backlight signal 55 on the basis of the luminance slope distribution factor data 56 for output as the LED luminance data 53. The LED luminance data 53 is data related to the second light emission intensity of each of the p×q LED units 32. The LED luminance data 53 is transmitted to the backlight drive circuit 31.

The light-emission-intensity determination unit 13*a* determines light emission intensity (second light emission intensity) for each LED unit 32 in such a manner as to increase the light emission intensity of the LED units 32 associated with the range of gaze in excess of the light emission intensity (first light emission intensity) specified on the basis of the HDR input image.

The "light emission intensity of the LED units 32 specified on the basis of an HDR input image" in the present embodiment means the first light emission intensity of the LED units 32 in the backlight signal 55.

Specifically, the light-emission-intensity determination unit 13*a* multiplies the first light emission intensity of each LED unit 32 in the backlight signal 55 by the correction factor specified for the region in the luminance slope distribution factor data 56, to determine a second light emission intensity for the LED units 32 and generate the LED luminance data 53.

The light-emission-intensity determination unit 13*a* determines the second light emission intensity as described earlier, which increases the second light emission intensity of the LED units 32 associated with the range of gaze above the first light emission intensity and renders the second light emission intensity lower than the first light emission intensity for the LED unit 32 that are in a region located farther away from the range of gaze.

The light emission control unit 13*b* controls the light emission of the LED units 32 on the basis of the light emission intensity determined by the light-emission-intensity determination unit 13*a*. Specifically, the light emission control unit 13*b* receives the LED luminance data 53 from the light-emission-intensity determination unit 13*a* and transmits the LED luminance data 53 to the backlight drive circuit 31 to control the light emission of the LED units 32.

Processes Performed by Control Unit 10A

Figure 6:
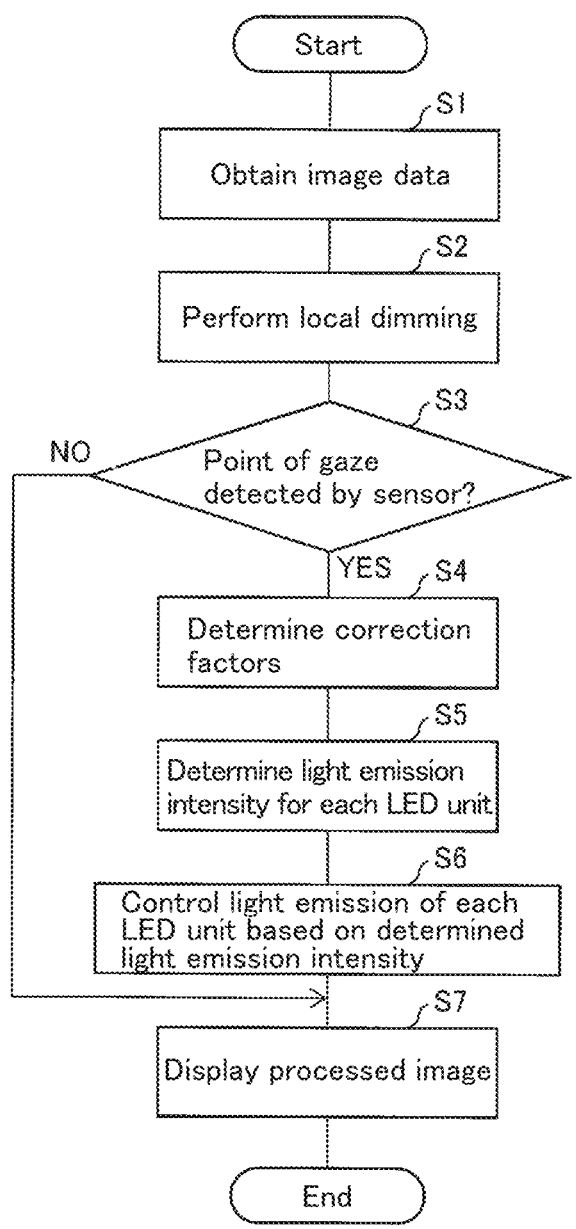
FIG. 6 is a flow chart representing an example process implemented by the control unit in accordance with Embodiment 1 of the present disclosure.

A description will be given of an example process carried out by the control unit 10A in the liquid crystal display device 1A (method of control implemented by the light source control device) in reference to FIG. 6. FIG. 6 is a flow chart representing an example process implemented by the control unit 10A.

Referring to FIG. 6, first, as the HDR signal 51 is fed to the liquid crystal display device 1A, the local dimming processing unit 11 obtains an HDR input image (step 1, which will be abbreviated as S1; this abbreviation also applies to other numbered steps). The HDR input image undergoes local dimming in the backlight signal generation unit 11*a*, the luminance distribution generation unit 11*b*, and the image signal adjustment unit 11*c* in the local dimming processing unit 11. The local dimming processing unit 11 then outputs the liquid crystal grayscale data 52 and the backlight signal 55 as a result of the process (S2). The liquid crystal grayscale data 52 is transmitted to the panel drive circuit 21, and the backlight signal 55 is transmitted to the backlight signal correcting unit 13 and the luminance slope information generation unit 12.

If the point-of-gaze detection sensor 2 does not detect a viewer's point of view (NO in step S3), the luminance slope information generation unit 12 does not generate the luminance slope distribution factor data 56, and the backlight signal correcting unit 13 does not receive the luminance slope distribution factor data 56. In the backlight signal correcting unit 13, the light-emission-intensity determination unit 13*a* passes on the backlight signal 55 as the LED luminance data 53 without changing it, and the light emission control unit 13*b* transmits the LED luminance data 53 to the backlight drive circuit 31 to control the light emission of the LED units 32. In other words, if NO in step S3, the HDR signal 51 undergoes local dimming in the local dimming processing unit 11, and an HDR display image is displayed on the display screen on the basis of the processed liquid crystal grayscale data 52 and backlight signal 55 (S7).

On the other hand, if the point-of-gaze detection sensor 2 detects a viewer's point of view (YES in step S3), the point-of-gaze detection sensor 2 generates and transmits the point-of-gaze data 54 to the luminance slope information generation unit 12. The luminance slope information generation unit 12 then generates the luminance slope distribution factor data 56 (determines correction factors) and transmits the generated luminance slope distribution factor data 56 to the light-emission-intensity determination unit 13a (S4).

Next, the light-emission-intensity determination unit 13a determines the light emission intensity (second light emission intensity) of the LED units 32 in the backlight 30 on the basis of the backlight signal 55 and the luminance slope distribution factor data 56 so as to increase the light emission intensity of the LED units 32 associated with the range of gaze in excess of the light emission intensity (first light emission intensity) specified in the backlight signal 55 (S5; light-emission-intensity determination step).

The light emission control unit 13b then controls the light emission of the LED units 32 on the basis of the light emission intensity of the LED units 32 determined in the previous light-emission-intensity determination step (S6; light emission control step). In other words, the LED luminance data 53 is transmitted from the light emission control unit 13b to the backlight drive circuit 31.

As described here, if YES in step S3, the HDR signal 51 undergoes local dimming in the local dimming processing unit 11, and the processed liquid crystal grayscale data 52 is transmitted to the panel drive circuit 21. Meanwhile, after the local dimming, the backlight signal 55 is corrected by the backlight signal correcting unit 13, and the corrected LED luminance data 53 is transmitted to the backlight drive circuit 31. An HDR display image is displayed on the display screen on the basis of the liquid crystal grayscale data 52 and the LED luminance data 53 that is obtained by correcting the backlight signal 55 (S7).

S2 and S3 may be implemented parallel to each other. Alternatively, S3 may be implemented before S2.

Specific Example of Process

Figure 7:
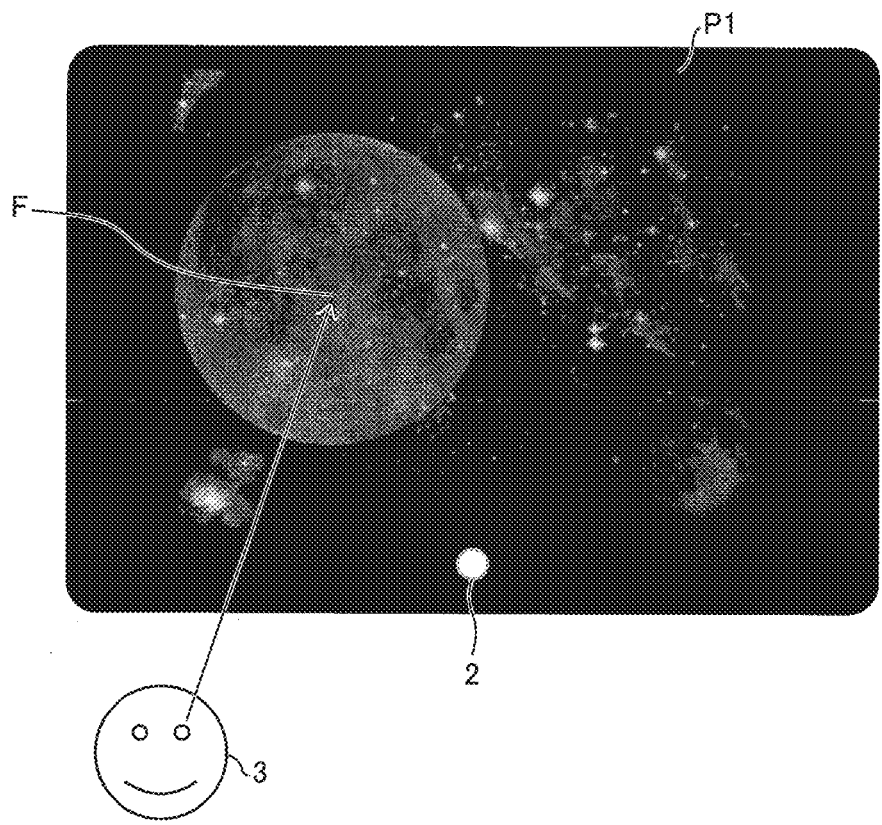
FIG. 7 is a drawing of an example unprocessed HDR display image being displayed on a display screen.
Figure 8:
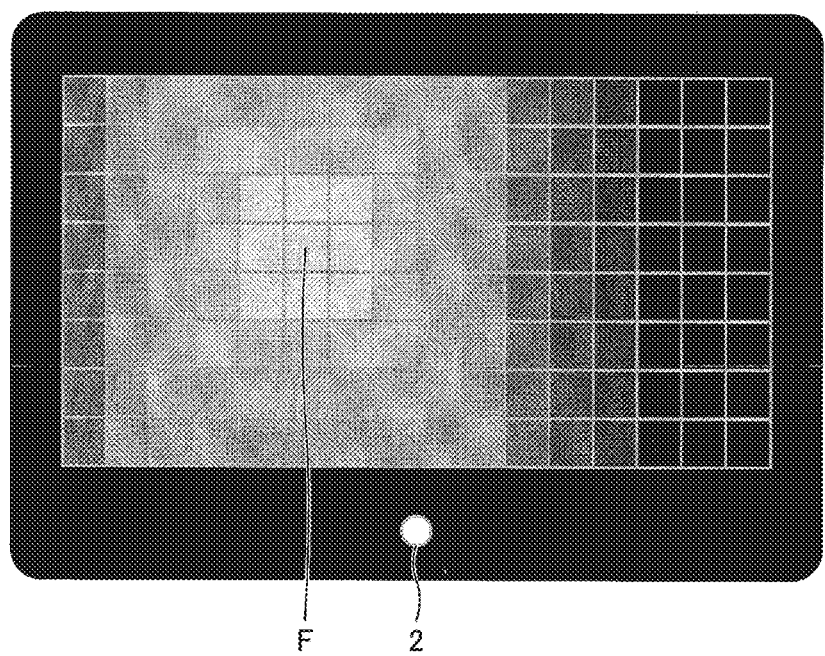
FIG. 8 is a visual representation of an example set of luminance slope distribution factor data generated by a luminance slope information generation unit on the basis of point-of-gaze data.
Figure 9:
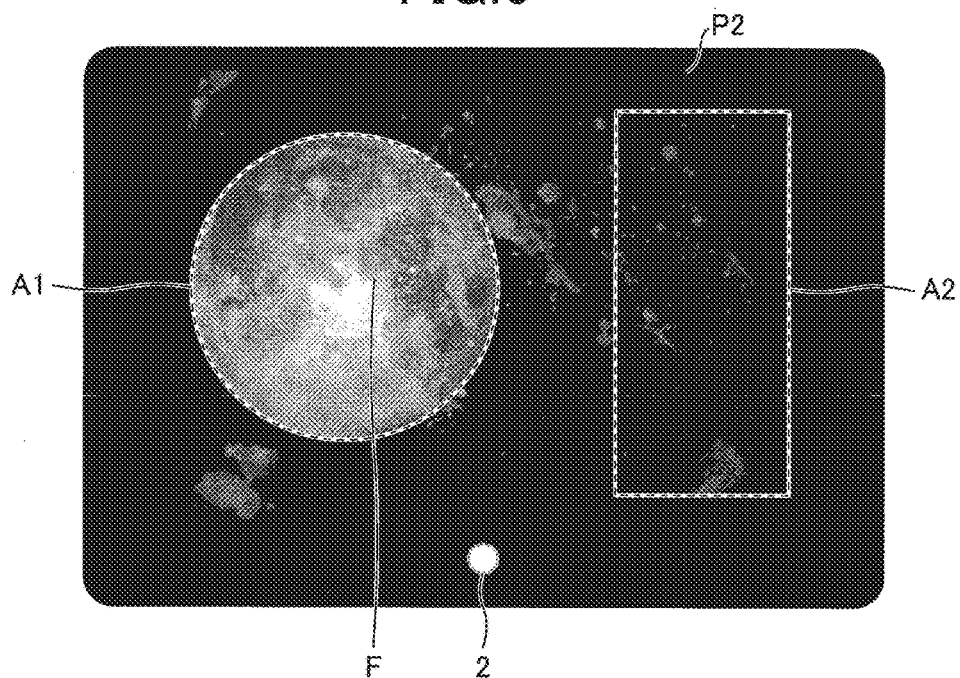
FIG. 9 is a drawing of an example processed HDR display image being displayed on a display screen.

A description will be given of a specific example of the process performed by the liquid crystal display device 1A of the present embodiment in reference to FIGS. 7 to 10. FIG. 7 is a drawing of an example unprocessed HDR display image P1 being displayed on a display screen. FIG. 8 is a visual representation of an example set of the luminance slope distribution factor data 56 generated by the luminance slope information generation unit 12 on the basis of the point-of-gaze data 54. FIG. 9 is a drawing of an example processed HDR display image P2 being displayed on the display screen. Portions (a) to (c) of FIG. 10 are drawings of example processed HDR display images P3 to P5 for different points of gaze F.

For convenience of description, FIG. 7 shows an example where the HDR display image P1 that is yet to be processed by the backlight signal correcting unit 13 in the control unit 10A (an HDR display image that has been processed only by the local dimming processing unit 11) is displayed on the display screen. However, in reality, if the point-of-gaze detection sensor 2 detects a viewer's point of gaze, an image that has been processed by the control unit 10A including the backlight signal correcting unit 13 (e.g., the processed HDR display image P2 shown in FIG. 9) is displayed on the display screen.

The HDR display image P1 shown in FIG. 7 is the same as the HDR input image P90 (see FIG. 2) described earlier to discuss issues of conventional liquid crystal display devices.

Referring to FIG. 7, if the point-of-gaze detection sensor 2 detects a point of gaze F of a viewer 3 on the display screen, the luminance slope information generation unit 12 generates the luminance slope distribution factor data 56 on the basis of information (point-of-gaze data 54) on the point of gaze F.

FIG. 8 is a visual representation of an example set of the luminance slope distribution factor data 56. In FIG. 8, the regions formed by dividing the display screen into a matrix appear brighter if they have a larger correction factor and appear darker if they have a smaller correction factor.

The backlight signal correcting unit 13 generates the LED luminance data 53 by multiplying the first light emission intensity of the LED units 32 given by the backlight signal 55 by the luminance slope distribution factor data 56. The light emission control unit 13b then controls the backlight 30 on the basis of the LED luminance data 53.

The display screen hence displays the processed HDR display image P2 as shown in FIG. 9. It is appreciated that the peak luminance of an area A1 near the point of gaze F is higher than in the HDR display image P1 and also that the luminance of areas far from the point of gaze F, such as an area A2, is lower than in the HDR display image P1.

In addition, the HDR display image displayed on the display screen changes with the position of the point of gaze F.

As shown in (a) of FIG. 10, for example, when the viewer 3 is gazing at a relatively large planet, an HDR display image P3 is displayed that shows an area A11 of the planet with an increased peak luminance. That enhances the contrast of the area A11. The HDR display image P3 is thus displayed in which the dynamic range of the HDR input image is sufficiently reproduced in the area A11.

As shown in (b) of FIG. 10, when the viewer 3 is gazing at a relatively small planet, an HDR display image P4 is displayed that shows an area A12 of the planet with an increased peak luminance. That brightens up in the HDR display image P4 the area A12 appearing relatively dark in the HDR display image P1. This in turn enhances contrast, more vividly displaying shades of small planets and boundaries between the small planets and the surround dark space. The HDR display image P4 is thus displayed in which the dynamic range of the HDR input image is sufficiently reproduced in the area A12.

In this example, the pupils of human eyes generally dilate poorly because the image displayed on the display screen has bright spots and the surrounding environment is bright. Therefore, the human eye would have trouble visually recognizing gray level differences in dark areas on the screen like the area A12 of the HDR display image P1. The area A12 of this nature is displayed a little brightly in the HDR display image P4. Consequently, displaying the area A12 with brighter gray levels than its inherent gray levels enables the human to readily recognize the display image in the area A12 even when the pupils poorly dilate.

As shown in (c) of FIG. 10, when the viewer 3 is gazing at a cluster of stars, an HDR display image P5 is displayed that shows an area A13 of the cluster of stars with an increased peak luminance. In addition, multiplying the first light emission intensity of the LED units 32 associated with the area A13 by correction factors increases differences in the second light emission intensity between those LED units 32 which have a relatively low first light emission intensity and those LED units 32 which have a relatively high first light emission intensity. The range of displayable gray levels can be hence increased in the area A13, which in turn enhances contrast. The HDR display image P5 is thus displayed in which the dynamic range of the HDR input image is sufficiently reproduced in the area A13.

Major Advantages

The control unit 10A, as described earlier, includes the luminance slope information generation unit 12 and the backlight signal correcting unit 13 and can be connected to the point-of-gaze detection sensor 2 in a communicable manner. The control unit 10A increases the light emission intensity of the LED units 32 associated with the range of gaze on the basis of the point of gaze F. Therefore, the peak luminance of the range of gaze can be increased, which enhances the contrast of the HDR display image.

The control unit 10A generates the luminance slope distribution factor data 56 representing a correction factor for each LED unit 32 and multiplies the first light emission intensity of the LED unit 32 specified by the local dimming processing unit 11 by one of the correction factors, in order to calculate the second light emission intensity of the LED unit 32. This is a relatively easy process. As a result, the process can be performed successively on the HDR input image and is readily applicable to moving image data (e.g., television broadcast) such as the HDR signal 51.

The process, although simple, can enhance the contrast of the HDR display image. In other words, the process can bring the contrast of the HDR display image closer to the contrast of the HDR input image.

The control unit 10A can darken (lower the outputs of the LED units 32) the outer regions except for the range of gaze. Resultant electric power savings may be used to increase the outputs (light emission intensity) of the LED units 32 in the range of gaze. Therefore, local dimming based on an HDR input image can increase the light emission intensity of the LED units 32, thereby increasing the peak luminance, in the range of gaze even if the generated backlight signal 55 is such that the total power consumption of the LED units 32 reaches a prescribed maximum level.

Alternatively, the control unit 10A may generate correction factors in the luminance slope distribution factor data 56 in such a manner that the total second light emission intensity for the LED units 32 is lower than the total first light emission intensity for the LED units 32. This arrangement can lower the power consumption of the liquid crystal display device 1A.

The control unit 10A may change the luminance slope distribution factor data 56 in accordance with whether the average luminance of a group of picture elements in the region of gaze is higher (the region of gaze is brighter) or lower (the region of gaze is darker) than a prescribed reference level. The control unit 10A generates the luminance slope distribution factor data 56 with a small angle of inclination if it is determined that the area of the HDR input image that corresponds to the region of gaze is relatively dark. Such data 56 can lower the possibility of the HDR display image having an unnatural appearance.

Variation Example 1

A description will be given of a liquid crystal display device 1A1 as a variation example of the liquid crystal display device 1A in accordance with the present embodiment in reference to FIG. 11. FIG. 11 is a schematic block diagram of a configuration of the liquid crystal display device 1A1 in accordance with a variation example of the present embodiment.

Referring to FIG. 11, the liquid crystal display device 1A1 in accordance with the present variation example includes a control unit 10A1 that in turn includes a local dimming processing unit 111 and a luminance slope information generation unit 12. The local dimming processing unit 111 includes a backlight signal generation unit 111a, a luminance distribution generation unit 11b, and an image signal adjustment unit 11c. The backlight signal generation unit 111a includes a light-emission-intensity determination unit 13a and a light emission control unit 13b. In other words, the liquid crystal display device 1A1 differs from the liquid crystal display device 1A of Embodiment 1 in that the backlight signal generation unit 111a has the function of the backlight signal correcting unit 13 in the liquid crystal display device 1A.

The backlight signal generation unit 111a in the local dimming processing unit 111 obtains an HDR input image represented by the HDR signal 51 and also obtains luminance slope distribution factor data 56 from the luminance slope information generation unit 12. The light-emission-intensity determination unit 13a generates LED luminance data 53 on the basis of the HDR input image and the luminance slope distribution factor data 56 and transmits the LED luminance data 53 to the light emission control unit 13b and the luminance distribution generation unit 11b. Specifically, the light-emission-intensity determination unit 13a of the present variation example determines a first light emission intensity for each LED unit 32 on the basis of a group of picture elements in each region of the HDR input image and thereafter multiplies the first light emission intensity by a correction factor in the luminance slope distribution factor data 56 to determine a second light emission intensity for the LED unit 32.

The luminance distribution generation unit 11b generates luminance distribution data 58 on the basis of the LED luminance data 53. The image signal adjustment unit 11c generates liquid crystal grayscale data 52 on the basis of the luminance distribution data 58 and the HDR input image given by the HDR signal 51 and transmits the liquid crystal grayscale data 52 to the panel drive circuit 21.

In the liquid crystal display device 1A of Embodiment 1, the local dimming processing unit 11 generates a backlight signal 55, and the backlight signal correcting unit 13 corrects the backlight signal 55 to generate the LED luminance data 53. In contrast, in the liquid crystal display device 1A1 in accordance with the present variation example, the backlight signal generation unit 111a in the local dimming processing unit 111 generates the LED luminance data 53 on the basis of the luminance slope distribution factor data 56. Therefore, the LED luminance data 53 can be generated in a single step. The control unit 10A1 can be hence composed of fewer structural members.

Variation Example 2

The liquid crystal display device 1A of Embodiment 1 and the liquid crystal display device 1A1 of Variation Example 1 perform local dimming on the HDR input image given by the HDR signal 51 and determine the light emission intensity of the LED units 32 associated with each region of the HDR input image in accordance with a group of picture elements in the region. The control unit for a liquid crystal display device in accordance with an aspect of the present disclosure however does not necessarily perform local dimming on the HDR input image. In other words, the control unit does not necessarily include a local dimming processing unit.

For example, the control unit may be configured, when the point-of-gaze detection sensor 2 does not detect a viewer's line of sight, so as to control the LED units 32 at a substantially constant light emission intensity and also in such a manner that the total power consumption of the LED units 32 is lower than a prescribed maximum level for a liquid crystal display device by a prescribed quantity, in other words, that the total power consumption of the LED units 32 does not reach the prescribed maximum level.

In this situation, upon the point-of-gaze detection sensor 2 detecting a viewer's line of sight, the luminance slope information generation unit 12 generates luminance slope distribution factor data 56 so as to increase the light emission intensity of the LED units 32 in the range of gaze similarly to Embodiment 1. Since the liquid crystal display device in accordance with the present variation example has electric power available to it for increasing the peak luminance of the LED units 32, the luminance slope information generation unit 12 is capable of generating the luminance slope distribution factor data 56 so as to increase the light emission intensity of the LED units 32 in the range of gaze, without having to lower the light emission intensity of the LED units 32 in regions located far from the range of gaze.

The luminance slope information generation unit 12 may generate liquid crystal grayscale data 52 on the basis of luminance distribution data 58 obtained when the LED units 32 are all controlled to emit light at a substantially constant light emission intensity. The luminance slope information generation unit 12 also applies the luminance slope distribution factor data 56 to the light emission intensity of the LED units 32 that are controlled to emit light at a substantially constant light emission intensity, in order to obtain LED luminance data 53.

This simple arrangement increases a peak luminance in the surroundings of a viewer's point of view, thereby enhancing the contrast of the HDR input image.

Variation Example 3

Each LED units 32 in the backlight 30 may include a red LED, a green LED, and a blue LED as described earlier. In such cases, the backlight signal 55 generated by the local dimming processing unit 11 contains information on the first light emission intensity for each of the red, green, and blue LEDs in each LED unit 32 (hereinafter, "the RGB backlight signal 55").

In the liquid crystal display device 1A configured as in Embodiment 1, the luminance slope information generation unit 12 generates luminance slope distribution factor data 56 on the basis of this RGB backlight signal 55. In this context, the luminance slope distribution factor data 56 may include a correction factor for each of the red, green, and blue LEDs in each LED unit 32. The luminance slope distribution factor data 56 in cases like this will be referred to as the RGB luminance slope distribution factor data 56 in the following description.

The RGB luminance slope distribution factor data 56 may be determined on the basis of an average or maximum value of the red, green, and blue gray levels for a group of picture elements in the region of gaze. The RGB luminance slope distribution factor data 56 may alternatively be generated on the basis of RGB average luminance levels across the entire HDR input image. In other words, the luminance slope distribution factor data 56 may include different sets of correction factors for red, green, and blue LEDs.

Additionally, the RGB luminance slope distribution factor data 56 needs only to be configured such that the total power consumption of the red, green, and blue LEDs in the LED units 32 does not exceed a prescribed maximum level.

The light-emission-intensity determination unit 13a multiplies the RGB luminance slope distribution factor data 56 by the RGB backlight signal 55. Specifically, the light-emission-intensity determination unit 13a multiplies correction factors for the red, green, and blue LEDs in each LED unit 32 by the first light emission intensities of the red, green, and blue LEDs respectively. The light-emission-intensity determination unit 13a then determines a second light emission intensity for the red, green, and blue LEDs as a result of the multiplication. The light emission control unit 13b transmits RGB LED luminance data 53 representing the second light emission intensities to the backlight drive circuit 31 to control the LED units 32.

The inclusion of a red, a green, and a blue LED in each LED unit 32 as described here enables the reproduction of a broad range of colors and increases the peak luminance in the range of gaze, thereby enhancing the contrast of the HDR display image.

The LED unit 32 may be replaced with a red laser diode (LD), a green LD, and a blue LD. In addition, each light source unit in the backlight 30 does not necessarily include a red, a green, and a blue light-emitting element. Instead, each unit may include, for example, R, G1, G2, B light-emitting elements.

Variation Example 4

The luminance slope information generation unit 12 may generate the luminance slope distribution factor data 56 by changing the correction factors in accordance with the first light emission intensities (backlight signal 55) of the LED units 32. In other words, if the outer regions of the range of gaze includes LED units 32 for which the first light emission intensity is relatively high, the correction factors in the luminance slope distribution factor data 56 may be further reduced (may approach 0) for the LED units 32. Resultant electric power savings may be used to more easily increase the light emission intensity of the LED units 32 in the range of gaze.

Embodiment 2

A description will be given of another embodiment of the present disclosure in reference to FIGS. 12 to 14. The present embodiment has the same configuration as Embodiment 1 unless otherwise mentioned here. For convenience of description, members of the present embodiment that have the same function as members described in Embodiment 1 are indicated by the same reference numerals, and description thereof is omitted.

In the liquid crystal display device 1A of Embodiment 1, the backlight 30 includes a matrix of p×q LED units 32 on the rear face of the liquid crystal panel 20, and the display screen is divided into p×q regions. In contrast, a liquid crystal display device 1B in accordance with the present embodiment includes, as a backlight 35: a row of p LED units 32 below and along a side edge of the liquid crystal panel 20; and a light guide plate 36 on the rear face of the liquid crystal panel 20. Additionally, the display screen is divided into p regions. In accordance with these differences between the two liquid crystal display devices, a light source control device (control unit 10B) in accordance with the present embodiment includes an image signal correcting unit 14 and is configured to transmit corrected liquid crystal grayscale data 57 obtained by correcting the liquid crystal grayscale data 52 to the panel drive circuit 21.

Configuration of Control Unit 10B

A configuration of the control unit 10B (light source control device) in accordance with the present embodiment will be described in reference to FIGS. 12 and 13. FIG. 12 is a block diagram of a configuration of major components of the liquid crystal display device 1B including the control unit 10B in accordance with the present embodiment. Portion (a) of FIG. 13 is a visual representation of an example set of the luminance slope distribution factor data 56 generated by the luminance slope information generation unit 12 on the basis of the point-of-gaze data 54, and (b) of FIG. 13 is a drawing of an example processed HDR display image P11.

Referring to FIG. 12, the liquid crystal display device 1B includes the control unit 10B, the liquid crystal panel 20, the panel drive circuit 21, the backlight 35, the backlight drive circuit 31, and the memory unit 40.

The backlight 35 is a so-called edge-lit backlight and includes the p LED units 32 and the light guide plate 36. The LED units 32 are arranged next to each other such that the light emitted by them enters the light guide plate 36 through its side face. The LED units 32 may be arranged in any manner.

The control unit 10B includes the local dimming processing unit 11, the luminance slope information generation unit 12, the backlight signal correcting unit 13, and the image signal correcting unit 14 (image correcting unit). The control unit 10B has an image processing function and a light source control function. The image processing function of the control unit 10B involves at least the local dimming processing unit 11 and the image signal correcting unit 14. The light source control function of the control unit 10B involves at least the luminance slope information generation unit 12 and the backlight signal correcting unit 13.

The image signal correcting unit 14 (image processing device) may be connected in a communicable manner as an external device that is communicable with the luminance slope information generation unit 12 and the backlight signal correcting unit 13 (light source control device).

The local dimming processing unit 11 in the present embodiment divides the display screen into 1×p regions and recognizes these regions. In other words, the display screen is divided into p rectangular regions arranged next to each other from a side of the display screen to an opposite side. The backlight signal 55 is data on a first light emission intensity for each of the p LED units 32. The luminance slope distribution factor data 56 includes a set of p correction factors.

Portion (a) of FIG. 13 is a visual representation of this set of p correction factors, showing that the correction factors decrease with an increasing distance from a region of gaze that includes the point of gaze F detected by the point-of-gaze detection sensor 2.

The backlight signal correcting unit 13 multiplies the backlight signal 55 by the luminance slope distribution factor data 56 for the purpose of correction, to generate the LED luminance data 53. The processed HDR display image P11 shown in (b) of FIG. 13 is displayed if an HDR display image is displayed on the display screen on the basis of this LED luminance data 53 and the liquid crystal grayscale data 52 generated by the local dimming processing unit 11.

The processed HDR display image P11, unlike the HDR input image, has an unnaturally bright area like the area A21 shown in the figure. This is due to the vertically elongated, rectangular shape of each of the p regions. More specifically, each region has a large area, which is different from Embodiment 1 where the display screen is divided into a matrix of p×q regions. Therefore, an increase of the light emission intensity of an LED unit 32 leads to an increases of luminance across the entire rectangular region associated with the LED unit 32.

The image signal correcting unit 14 is provided in the control unit 10B in accordance with the present embodiment to correct unnatural areas like the area A11.

The image signal correcting unit 14 corrects the luminance of an HDR input image displayed on the display screen, on the basis of the second light emission intensity of the LED units 32 determined by the light-emission-intensity determination unit 13a. Specifically, the image signal correcting unit 14 generates the luminance distribution data 58 on the basis of the LED luminance data 53 received from the light-emission-intensity determination unit 13a. The generated luminance distribution data 58 represents the luminance distribution of the light emitted by the backlight 35 (the luminance distribution of the light emitted by the LED units 32 and then guided by the light guide plate 36 to the liquid crystal panel 20). In the luminance distribution data 58, an incoming light intensity is the intensity of light that is incident to the pixels 22, in the liquid crystal panel 20, that are associated with the picture elements of the HDR input image. The image signal correcting unit 14 divides the RGB gray levels of each picture element of the HDR input image by the incoming light intensity associated with the picture element to generate the corrected liquid crystal grayscale data 57 as a result of the division. In other words, the image signal correcting unit 14 corrects gray levels for the picture elements of the HDR input image using the second light emission intensity, to generate an HDR output image for display on the display screen.

The image signal correcting unit 14 may correct the liquid crystal grayscale data 52 by any method in order to generate the corrected liquid crystal grayscale data 57. For example, an object in an HDR input image may be recognized, for example, by edge processing, so that the regions in which there exists the object including a point of gaze can be brightened up whereas the outer regions of the object are either not brightened up at all or brightened up by a smaller degree.

These arrangements correct unnatural parts of an area A21 of the processed HDR display image P11 and increase the peak luminance in the range of gaze, thereby enhancing contrast.

Processes Executed by Control Unit 10B

A description will be given of an example process executed by the control unit 10B in the liquid crystal display device 1B (method of control implemented by the light source control device) in reference to FIG. 14. FIG. 14 is a flow chart representing an example process implemented by the control unit 10B.

Referring to FIG. 14, first, upon the HDR signal 51 being fed to the liquid crystal display device 1A, the local dimming processing unit 11 obtains an HDR input image (S11). The local dimming processing unit 11 performs local dimming on the basis of the HDR input image and outputs the liquid crystal grayscale data 52 and the backlight signal 55 (S12). The liquid crystal grayscale data 52 is transmitted to the image signal correcting unit 14, and the backlight signal 55 is transmitted to the backlight signal correcting unit 13 and the luminance slope information generation unit 12.

If the point-of-gaze detection sensor 2 does not detect a viewer's point of view (NO in step S13), the luminance slope information generation unit 12 does not generate the luminance slope distribution factor data 56, and the backlight signal correcting unit 13 does not receive the luminance slope distribution factor data 56. The light-emission-intensity determination unit 13a handles the backlight signal 55 as the LED luminance data 53 without changing it, and the light emission control unit 13b transmits the LED luminance data 53 to the backlight drive circuit 31 to control the light emission of the LED units 32. Meanwhile, the image signal correcting unit 14 passes on the liquid crystal grayscale data 52 to the panel drive circuit 21 without correcting it. In other words, if NO in step S13, the HDR signal 51 undergoes local dimming in the local dimming processing unit 11, and an HDR display image is displayed on the display screen on the basis of the processed liquid crystal grayscale data 52 and the backlight signal 55 (S18).

On the other hand, if the point-of-gaze detection sensor 2 detects a viewer's point of view (YES in step S13), the point-of-gaze detection sensor 2 generates and transmits the point-of-gaze data 54 to the luminance slope information generation unit 12. The luminance slope information generation unit 12 then generates the luminance slope distribution factor data 56 (determines correction factors) and transmits the generated luminance slope distribution factor data 56 to the light-emission-intensity determination unit 13a (S14).

Next, the light-emission-intensity determination unit 13a determines the light emission intensity (second light emission intensity) of the LED units 32 in the backlight 30 on the basis of the backlight signal 55 and the luminance slope distribution factor data 56 so as to increase the light emission intensity of the LED units 32 associated with the range of gaze in excess of the light emission intensity (first light emission intensity) specified in the backlight signal 55 (S15; light-emission-intensity determination step). Data (LED luminance data 53) on this determined light emission intensity is transmitted to the light emission control unit 13b and the image signal correcting unit 14.

The image signal correcting unit 14 first generates luminance distribution data on the basis of data on the determined light emission intensity received from the light-emission-intensity determination unit 13a. The image signal correcting unit 14 corrects the liquid crystal grayscale data 52 using the luminance distribution data in order to generate the corrected liquid crystal grayscale data 57 (S16). In other words, the corrected liquid crystal grayscale data 57 for correcting the transmittance of the liquid crystal in the liquid crystal panel 20 is generated in step S16 on the basis of the determined light emission intensity. The image signal correcting unit 14 then transmits the corrected liquid crystal grayscale data 57 to the panel drive circuit 21.

The light emission control unit 13b then controls the light emission of the LED units 32 in accordance with the light emission intensity of the LED units 32 determined in the light-emission-intensity determination step (S17; light emission control step). In other words, the light emission control unit 13b transmits the LED luminance data 53 to the backlight drive circuit 31.

As described here, if YES in step S13, the liquid crystal grayscale data 52 after local dimming is corrected by the image signal correcting unit 14, and the corrected liquid crystal grayscale data 57 is transmitted to the panel drive circuit 21. Meanwhile, the backlight signal 55 after local dimming is corrected by the backlight signal correcting unit 13, and the LED luminance data 53 after correction is transmitted to the backlight drive circuit 31. An HDR display image is displayed on the display screen on the basis of the corrected liquid crystal grayscale data 57 and the LED luminance data 53 obtained by correcting the backlight signal 55 (S18).

S12 and S13 may be implemented parallel to each other. Alternatively, S13 may be implemented before S12. In addition, S16 and S17 may be implemented parallel to each other. Alternatively, S17 may be implemented before S16.

As described here, the light source control device (control unit 10B) in accordance with an aspect of the present disclosure, when used in the liquid crystal display device 1B including the edge-lit backlight 35 in which the LED units 32 are arranged along a side edge of the display screen, is also capable of increasing light emission intensity in the range of gaze, thereby enhancing the contrast of the HDR display image.

Embodiment 3

A description will be given of another embodiment of the present disclosure in reference to FIGS. 15 and 16. The present embodiment has the same configuration as Embodiments 1 and 2 unless otherwise mentioned here. For convenience of description, members of the present embodiment that have the same function as members described in either one of Embodiments 1 and 2 are indicated by the same reference numerals, and description thereof is omitted.

In the liquid crystal display device 1B of Embodiment 2, the backlight 35 includes a row of p LED units 32 arranged next to each other along a side edge of the light guide plate 36, and the display screen is divided into p regions. In contrast, a liquid crystal display device 1C in accordance with the present embodiment includes a total of 2×p LED units 32 along opposite side edges of the light guide plate 36, p LED units 32 along each side edge. Additionally, the display screen is divided into 2×p regions. Except for these differences, the liquid crystal display device 1C has the same configuration as the liquid crystal display device 1A of Embodiment 1.

A description will be given of a configuration of a control unit 10C (light source control device) in accordance with the present embodiment in reference to FIGS. 15 and 16. FIG. 15 is a block diagram of a configuration of major components of the liquid crystal display device 1C including the control unit 10C in accordance with the present embodiment. Portion (a) of FIG. 16 is a visual representation of an example set of luminance slope distribution factor data 56 generated by the luminance slope information generation unit 12 on the basis of the point-of-gaze data 54, and (b) of FIG. 16 is a drawing of an example processed HDR display image.

Referring to FIG. 15, the liquid crystal display device 1C includes the control unit 10C, the liquid crystal panel 20, the panel drive circuit 21, a backlight 38, the backlight drive circuit 31, and the memory unit 40.

The backlight 38 is an edge-lit backlight as is the case with the backlight 35 of Embodiment 2. The backlight 38 however includes 2×p LED units 32.

The local dimming processing unit 11 in the present embodiment divides the display screen into 2×p regions and recognizes these regions. In other words, the display screen is divided into p rectangular areas arranged next to each other from a side of the display screen to an opposite side, with each of the p areas further divided equally into two left and right regions in terms of a direction in which the areas are arranged next to each other, which gives a total of 2×p regions.

The backlight signal 55 is data on a first light emission intensity for each of the 2×p LED units 32. The luminance slope distribution factor data 56 includes a set of 2×p correction factors. Portion (a) of FIG. 16 is a visual representation of this set of 2×p correction factors, showing that the correction factors decrease with an increasing distance from a region of gaze that includes the point of gaze F detected by the point-of-gaze detection sensor 2.

The backlight signal correcting unit 13 multiplies the first light emission intensity of each LED unit 32 in the backlight signal 55 by a correction factor specified in the luminance slope distribution factor data 56 for the associated region, for the purpose of correction to generate the LED luminance data 53. A processed HDR display image P12 shown in (b) of FIG. 16 is displayed if an HDR display image is displayed on the display screen on the basis of this LED luminance data 53 and the liquid crystal grayscale data 52 generated by the local dimming processing unit 11.

The processed HDR display image P12 in the present embodiment has no distinctly unnatural regions for the following reason. Each of the 2×p regions is relatively small, and the effect of an increased light emission intensity of the LED units 32 in the range of gaze is only partial.

As described here, the light source control device (control unit 10C) in accordance with an aspect of the present disclosure, when used in the liquid crystal display device 1C including the edge-lit backlight 38 in which the LED units 32 are arranged along two side edges of the display screen, is also capable of increasing light emission intensity in the range of gaze, thereby enhancing the contrast of the HDR display image.

Embodiment 4

A description will be given of another embodiment of the present disclosure in reference to FIG. 17. The present embodiment has the same configuration as Embodiments 1 to 3 unless otherwise mentioned here. For convenience of description, members of the present embodiment that have the same function as members described in any one of Embodiments 1 to 3 are indicated by the same reference numerals, and description thereof is omitted.

The liquid crystal display devices 1A to 1C of Embodiments 1 to 3 include the LED units 32 as a plurality of light sources and use the liquid crystal panel 20 to display HDR display images on a display screen. In contrast, a display device 1D in accordance with the present embodiment is a self light-emitting display device (OLED display) that includes organic light-emitting diodes (OLEDs) as a plurality of light sources and that displays HDR display images on the display screen by using the organic light-emitting diodes. The display device 1D displays images using the light emitted by the organic light-emitting diodes.

In OLED displays, the peak luminance of an HDR display image is restricted in terms of power consumption. In addition, organic materials can quickly decay if the light emission intensity is very high. The peak luminance has a prescribed maximum level for these reasons. Another issue of the OLED display is that image burn-in is likely if the same image is displayed over an extended period of time. The display device 1D includes a control unit 10D to address these issues.

FIG. 17 is a block diagram of a configuration of major components of the display device 1D including the control unit 10D in accordance with the present embodiment.

Referring to FIG. 17, the display device 1D in accordance with the present embodiment includes the control unit 10D, a display unit 61, and the memory unit 40. The control unit 10D includes a luminance slope information generation unit 62, a light-emission-intensity determination unit 63*a*, and a light emission control unit 63*b*.

The display unit 61 is an OLED display. The organic light-emitting diodes in the display screen emit light to display HDR display images.

The luminance slope information generation unit 62 generates the luminance slope distribution factor data 56 on the basis of the point-of-gaze data 54 received from the point-of-gaze detection sensor 2 and the HDR input image represented by the HDR signal 51. Alternatively, the luminance slope information generation unit 62 may generate the luminance slope distribution factor data 56 on the basis of the RGB gray levels of a group of picture elements in a region of gaze.

The light-emission-intensity determination unit 63*a* generates device light-emission-intensity data 64 representing a light emission intensity for each organic light-emitting diode provided in the display unit 61 on the basis of the HDR input image represented by the HDR signal 51 and the luminance slope distribution factor data 56.

The light emission control unit 63*b* controls the light emission of the organic light-emitting diodes provided in the display unit 61 on the basis of the device light-emission-intensity data 64.

In the display device 1D in accordance with the present embodiment, the control unit 10D performs a process that increases peak luminance in a range of gaze, thereby enhancing contrast. In addition, for example, if the point-of-gaze detection sensor 2 does not detect a line of sight (e.g., if the viewer is looking away from the display screen), the control unit 10D performs no process that increases peak luminance based on a line of sight. Therefore, in such a case, the display device 1D may maintain a low light emission intensity for all the organic light-emitting diodes provided in the display unit 61. This arrangement can mitigate the decay of the organic light-emitting diodes and prolong the lifetime of the organic light-emitting diodes. The arrangement can also alleviate image burn-in.

The light source control device (control unit 10D) in accordance with an aspect of the present disclosure may be used in other types of self light-emitting display devices, including those which include inorganic light-emitting diodes or LEDs.

Software Implementation

The control blocks of the control units 10A to 10D in the liquid crystal display devices 1A to 1D (particularly, the light-emission-intensity determination units 13*a*, 63*a* and the light emission control units 13*b*, 63*b*) may be implemented by logic circuits (hardware) fabricated, for example, in the form of an integrated circuit (IC chip) and may be implemented by software executed by a CPU (central processing unit).

In the latter form of implementation, the control units 10A to 10D include, among others: a CPU that executes instructions from programs or software by which various functions are implemented; a ROM (read-only Memory) or like storage device (referred to as a "storage medium") containing the programs and various data in a computer-readable (or CPU-readable) format; and a RAM (random access memory) into which the programs are loaded. The computer (or CPU) then retrieves and executes the programs contained in the storage medium, thereby achieving the object of the present disclosure. The storage medium may be a "non-transient, tangible medium" such as a tape, a disc, a card, a semiconductor memory, or programmable logic circuitry. The programs may be fed to the computer via any transmission medium (e.g., over a communications network or by broadcasting waves) that can transmit the programs. The present disclosure, in an aspect thereof, encompasses data signals on a carrier wave that are generated during electronic transmission of the programs.

General Description

The present disclosure, in aspect 1 thereof, is directed to a light source control device (control units 10A to 10D) that controls a plurality of light sources (LED units 32, organic light-emitting diodes) provided in a display device (liquid crystal display devices 1A to 1C, display device 1D) that displays an image by light emitted by the light sources (LED units 32, organic light-emitting diodes), the light source control device being capable of connecting in a communicable manner to a sensor (point-of-gaze detection sensor 2) that detects a point of gaze F of a viewer 3 on a display screen of the display device (liquid crystal display devices 1A to 1C, display device 1D), the light source control device including: a light-emission-intensity determination unit (luminance slope information generation units 12, 62, light-emission-intensity determination units 13a, 63a) configured to determine a light emission intensity for each of the light sources (LED units 32, organic light-emitting diodes) in such a manner that the light emission intensity of at least one of the light sources (LED units 32, organic light-emitting diodes) that is associated with a range of gaze including the point of gaze F detected by the sensor (point-of-gaze detection sensor 2) is increased in excess of a light emission intensity specified based on the image; and a light emission control unit 13b, 63b configured to control light emission of the light sources (LED units 32, organic light-emitting diodes) based on the light emission intensities determined by the light-emission-intensity determination unit (luminance slope information generation units 12, 62, light-emission-intensity determination units 13a, 63a).

According to this configuration, the sensor detects a viewer's point of gaze on the display screen of the display device. The light emission intensities of the light sources are specified on the basis of an image displayed by the display device (image fed to the display device). The "image displayed by the display device" refers to an image displayed on the display screen when the sensor is not detecting a point of gaze.

(i) As an example, if the display device is a liquid crystal display device that includes LED units as light sources, the light emission intensities of the light sources specified based on an image may be the light emission intensities of the light sources specified by typical local dimming or the light emission intensities of the light sources specified by a prescribed value.

(ii) As another example, if the display device is a display device that includes, for example, organic light-emitting diodes as light sources (self light-emitting display device), the light emission intensities of the light sources specified based on an image may be the light emission intensities of the light sources specified based on an image fed to the display device and a prescribed maximum power consumption or the light emission intensities of the light sources specified by a prescribed value.

For instance, in either (i) or (ii), the light-emission-intensity determination unit determines the light emission intensities of the light sources in such a manner that the light emission intensities of those light sources which are associated with the range of gaze including the point of gaze detected by the sensor are increased respectively in excess of the specified light emission intensities.

This configuration can increase peak luminance in the range of gaze, thereby enhancing the contrast of the image. This process can be implemented by multiplying the light emission intensity of each light source, for example, by a suitable correction factor that may be specified in a suitable manner.

Therefore, the process is simple and enhances the contrast of the image. The following advantages are also achieved if the light emission intensities of the light sources are set to a prescribed value. Namely, the prescribed value may be determined in advance such that the total power consumption of the light sources is lower than a prescribed maximum level for the display device by a prescribed quantity (to ensure a sufficient margin for a limit), which lowers power consumption. The prescribed value thus determined can mitigate the decay of the organic light-emitting diodes and alleviate image burn-in on the display screen, for example, if the light sources are organic light-emitting diodes.

In aspect 2 of the present disclosure, the light source control device (control units 10A to 10D) of aspect 1 may be configured such that the light-emission-intensity determination unit (luminance slope information generation units 12, 62, light-emission-intensity determination units 13a, 63a) determines the light emission intensities of the light sources (LED units 32, organic light-emitting diodes) in such a manner as to increase the light emission intensity of the light source(s) (LED units 32, organic light-emitting diodes) which is/are associated with the range of gaze and also in such a manner that the light emission intensities of the light sources (LED units 32, organic light-emitting diodes) are progressively lower with an increasing distance from the range of gaze than respective light emission intensities specified based on the image.

According to this configuration, the light-emission-intensity determination unit determines the light emission intensities of the light sources in such a manner that the light emission intensities of the light sources are progressively lower with an increasing distance from the range of gaze than the respective light emission intensities specified for the light sources based on the image. For example, the light-emission-intensity determination unit generates correction factors for the light sources respectively. The correction factor is set to a value between 0 to 1 in the regions that are relatively far from the range of gaze and to a value that progressively approaches 0 with an increasing distance from the range of gaze. These set values lower the light emission intensity in regions that are far from the range of gaze, thereby lowering power consumption.

Therefore, even if the total power consumption of the light sources has reached a prescribed maximum level for the display device when the light emission intensities of the light sources are specified on the basis of the image displayed by the display device (image fed to the display device), the peak luminance of the range of gaze can be increased using the electric power savings made in the regions that are relatively far from the range of gaze, thereby enhancing the contrast of the image. Peak luminance in regions around the point of gaze (range of gaze) can be increased by setting the correction factors to suitable values.

In aspect 3 of the present disclosure, the light source control device (control units 10A to 10D) of either aspect 1 or 2 may be configured such that the light-emission-intensity determination unit (luminance slope information generation units 12, 62, light-emission-intensity determination units 13a, 63a) determines the light emission intensities in such a manner that the light sources achieve the light emission intensities without consuming power exceeding a prescribed maximum level.

According to this configuration, the light sources emit light with the determined light emission intensities, thereby consuming a total power that is smaller than a prescribed maximum level for the display device. That reduces the workload of the display device.

The present disclosure, in aspect 4 thereof, is directed to a display device including the light source control device of any one of aspects 1 to 3.

According to this configuration, the display device achieves the same advantages as does the light source control device of an aspect of the present disclosure.

The present disclosure, in aspect 5 thereof, is directed to an image processing device capable of connecting in a communicable manner to the light source control device of any one of aspects 1 to 3, the image processing device including an image correcting unit (image signal correcting unit 14) configured to correct, based on the light emission intensities determined by the light-emission-intensity determination unit (luminance slope information generation unit 12 and light-emission-intensity determination unit 13a), luminance of an image displayed on the display screen.

Depending on the arrangement of the light sources in the display device, the display image may have a flaw if the light sources emit light on the basis of the light emission intensities determined by the light-emission-intensity determination unit. In such an arrangement of the light sources in the display device, this configuration can correct the luminance of the image, thereby displaying a higher quality image on the display screen.

The present disclosure, in aspect 6 thereof, is directed to a method of control implemented by a light source control device to control a plurality of light sources provided in a display device that displays an image by light emitted by the light sources, the light source control device being capable of connecting in a communicable manner to a sensor that detects a point of gaze of a viewer on a display screen of the display device, the method including: the light-emission-intensity determination step of determining a light emission intensity for each of the light sources in such a manner that the light emission intensity of at least one of the light sources that is associated with a range of gaze including the point of gaze detected by the sensor is increased in excess of a light emission intensity specified based on the image; and the light emission control step of controlling light emission of the light sources based on the light emission intensities determined in the light-emission-intensity determination step.

According to this configuration, the method achieves the same advantages as does the light source control device of an aspect of the present disclosure.

The light source control device of any aspect of the present disclosure may be implemented on a computer, in which case the present disclosure encompasses a control program, for implementing the light source control device, which when run on a computer causes the computer to operate as the various units (software elements) of the light source control device and also encompasses a computer-readable storage medium containing the control program.

The present invention is not limited to the description of the embodiments above and may be altered within the scope of the claims. Embodiments based on a proper combination of technical means disclosed in different embodiments are encompassed in the technical scope of the present invention. Furthermore, a new technological feature may be created by combining different technological means disclosed in the embodiments.

CROSS-REFERENCE TO RELATED APPLICATIONS

The present application claims the benefit of priority to Japanese Patent Application, Tokugan, No. 2016-242548, filed on Dec. 14, 2016, the entire contents of which are incorporated herein by reference.

REFERENCE SIGNS LIST 1A, 1B, 1C Liquid Crystal Display Device (Display Device)
1D Display Device
2 Point-of-gaze Detection Sensor (Sensor)
3 Viewer
10A, 10B, 10C, 10D Control Unit (Light Source Control Device)
12 Luminance Slope Information Generation Unit (Light-emission-intensity Determination Unit)
13a Light-emission-intensity Determination Unit
13b Light Emission Control Unit
14 Image Signal Correcting Unit (Image Correcting Unit)
32 LED Unit (Light Source)
62 Luminance Slope Information Generation Unit (Light-emission-intensity Determination Unit)
63a Light-emission-intensity Determination Unit
63b Light Emission Control Unit

The invention claimed is:

1. A light source control device that controls a plurality of light sources provided in a display device that displays an image by light emitted by the plurality of light sources, the light source control device connecting in a communicable manner to a sensor that detects a point of gaze of a viewer on a display screen of the display device, the light source control device comprising:
light-emission-intensity determination circuitry that determines a light emission intensity for each of the plurality of light sources in such a manner that the light emission intensity of at least one of the plurality of light sources that is associated with a range of gaze including the point of gaze detected by the sensor is increased in excess of a light emission intensity specified based on the image; and
light emission control circuitry that controls light emission of the plurality of light sources based on the light emission intensities determined by the light-emission-intensity determination circuitry, wherein
the light-emission-intensity determination circuitry determines the light emission intensities of the plurality of light sources to increase the light emission intensity of the at least one of the plurality of light sources that is associated with the range of gaze and such that the light emission intensities of the plurality of light sources are progressively lower with an increasing distance from the range of gaze than respective light emission intensities specified based on the image,
the light-emission-intensity determination circuitry determines an amount of decrease in the light-emission intensity of one of the plurality of light sources corresponding to a region remote from the range of gaze, in accordance with an amount of increase in the light emission intensity of the one of the plurality of light sources associated with the range of gaze, and
the light-emission-intensity determination circuitry determines the amount of increase in the light-emission intensity of the at least one of the plurality of light sources that is associated with the range of gaze, based on a result of determining whether or not a portion of the image that is associated with the range of gaze has a gray level greater than or equal to a predetermined value.

2. The light source control device according to claim 1, wherein the light-emission-intensity determination circuitry determines the light emission intensities such that the plurality of light sources achieve the light emission intensities without consuming power exceeding a prescribed maximum level.

3. A display device comprising the light source control device according to claim 1.

4. An image processing device that connects in a communicable manner to the light source control device according to claim 1, the image processing device including image correcting circuitry that corrects, based on the light emission intensities determined by the light-emission-intensity determination circuitry, luminance of the image displayed on the display screen.

5. The light source control device according to claim 1, wherein the light-emission-intensity determination circuitry determines the light emission intensities in such a manner that the plurality of light sources achieve the light emission intensities without consuming power exceeding a prescribed maximum level.

6. The light source control device according to claim 1, wherein the light-emission-intensity determination circuitry determines a ratio between the amount of increase in the light emission intensity of the at least one light source that is associated with the range of gaze and the amount of decrease in the light emission intensity of one of the plurality of light sources corresponding to the region remote from the range of gaze in accordance with the light emission intensity specified based on the image.

* * * * *